US009213586B2

(12) United States Patent
Shorb

(10) Patent No.: US 9,213,586 B2
(45) Date of Patent: Dec. 15, 2015

(54) COMPUTER-IMPLEMENTED SYSTEMS FOR RESOURCE LEVEL LOCKING WITHOUT RESOURCE LEVEL LOCKS

(75) Inventor: Charles Scott Shorb, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 1686 days.

(21) Appl. No.: 12/406,371

(22) Filed: Mar. 18, 2009

(65) Prior Publication Data

US 2010/0242043 A1 Sep. 23, 2010

(51) Int. Cl.
*G06F 9/52* (2006.01)

(52) U.S. Cl.
CPC .................................... *G06F 9/526* (2013.01)

(58) Field of Classification Search
None
See application file for complete search history.

(56) References Cited

U.S. PATENT DOCUMENTS 4,604,694 A 8/1986 Hough
5,692,193 A 11/1997 Jagannathan et al.
5,860,159 A 1/1999 Hagersten
5,887,167 A 3/1999 Sutton
5,933,825 A 8/1999 McClaughry et al.
6,012,081 A 1/2000 Dorn et al.
6,016,490 A 1/2000 Watanabe et al.
6,029,190 A 2/2000 Oliver
6,031,973 A 2/2000 Gomi et al.
6,112,222 A * 8/2000 Govindaraju et al. ........ 718/102
6,247,025 B1 6/2001 Bacon
6,343,339 B1 1/2002 Daynes
6,480,918 B1 11/2002 McKenney et al.
6,546,443 B1 4/2003 Kakivaya et al.
6,560,627 B1 * 5/2003 McDonald et al. ........... 718/103
6,598,068 B1 * 7/2003 Clark ........................... 718/104
6,691,194 B1 2/2004 Ofer
6,718,448 B1 4/2004 Ofe
6,779,182 B1 8/2004 Zolnowsky
6,836,887 B1 12/2004 Such
6,883,026 B1 4/2005 Onodera et al.
7,080,375 B2 7/2006 Martin
7,117,496 B1 10/2006 Ramesh et al.
7,155,588 B1 12/2006 Jeter, Jr.
7,376,744 B2 5/2008 Loaiza et al.
7,380,073 B2 5/2008 Shorb
7,444,634 B2 10/2008 Jeyaram
7,594,091 B2 9/2009 Shorb
8,078,653 B1 * 12/2011 Bisson et al. ................. 707/829
2002/0078119 A1 * 6/2002 Brenner et al. ............... 709/102
2003/0126187 A1 7/2003 Won et al.
2003/0200398 A1 10/2003 Harris
2003/0233393 A1 12/2003 Li (Continued)

OTHER PUBLICATIONS

Butenhof, David R., "Programming with POSIX Threads", Addison-Wesley Professional Computing Series, Chapter 7, pp. 241-269 [Oct. 1997].

(Continued)

*Primary Examiner* — Jacob A Petranek
(74) *Attorney, Agent, or Firm* — Kilpatrick Townsend & Stockton LLP

(57) ABSTRACT

Computer-implemented systems and methods regulate access to a plurality of resources in a pool of resources without requiring individual locks associated with each resource. Access to one of the plurality of resources is requested, where a resource queue for managing threads waiting to access a resource is associated with each of the plurality of resources. A resource queue lock associated with the resource is acquired, where a resource queue lock is associated with multiple resources.

51 Claims, 15 Drawing Sheets

(56) References Cited

U.S. PATENT DOCUMENTS

| | | | | |
|---|---|---|---|---|
| 2004/0019875 | A1 | 1/2004 | Welch | |
| 2004/0059733 | A1 | 3/2004 | Li | |
| 2004/0088573 | A1* | 5/2004 | Jeyaram | 713/201 |
| 2004/0117531 | A1 | 6/2004 | McKenney | |
| 2004/0187122 | A1 | 9/2004 | Gosalia et al. | |
| 2006/0130062 | A1 | 6/2006 | Burdick et al. | |
| 2006/0230411 | A1* | 10/2006 | Richter et al. | 719/328 |
| 2007/0061810 | A1* | 3/2007 | Mehaffy et al. | 718/104 |
| 2007/0113233 | A1 | 5/2007 | Collard et al. | |
| 2007/0234326 | A1 | 10/2007 | Kejariwal et al. | |
| 2007/0271450 | A1 | 11/2007 | Doshi et al. | |
| 2008/0109807 | A1* | 5/2008 | Rosenbluth | 718/102 |
| 2008/0168458 | A1* | 7/2008 | Fachan et al. | 718/104 |
| 2008/0250203 | A1* | 10/2008 | Schreter | 711/117 |
| 2008/0320262 | A1* | 12/2008 | McKenney et al. | 711/163 |
| 2009/0271789 | A1* | 10/2009 | Babich | 718/100 |

OTHER PUBLICATIONS

Deitel, Harvey M., "An Introduction to Operating Systems", Chapter 5, pp. 112-151 [Feb. 1990].

Glasser, Daniel, "Efficient Synchronization Techniques for Multithreaded Win32®-based Applications", Microsoft Systems Journal, vol. 10, No. 2, pp. 61-81 [Feb. 1995].

Schimmel, Curt, "UNIX® Systems for Modern Architectures:Symmetric Multiprocessing and Caching for Kernel Programmers", Addison-Wesley Publishing Company, pp. 154-169, Jun. 15, 1994.

Stallings, William Ph.D., "Operating Systems: Internals and Design Principles", 4$^{th}$ Edition, Prentice Hall, pp. 212-216, 2001.

* cited by examiner

COMPUTER-IMPLEMENTED SYSTEMS FOR RESOURCE LEVEL LOCKING WITHOUT RESOURCE LEVEL LOCKS

TECHNICAL FIELD

This document relates generally to computer memory management and more particularly memory read-write protection.

BACKGROUND

Effective and efficient resource management is a basic computer system requirement, where memory and input/output (I/O) resources should be properly protected to ensure proper computer function without injection of large, performance-sapping overhead. Managing resources safely in a multi-threaded environment is a non-trivial task, especially when access to individual resources is to be protected. A modern computing system may manage millions or more individual resources that are accessed by thousands or more requesters. Thus, proper resource management may be vital to maintaining a high level of system performance.

FIG. 1 depicts an example resource management environment 10. The resource management environment 10 includes a resource pool 12 that contains memory locations, I/O devices, or other resources. The resource management environment 10 also includes a number of operating threads 14, fibers, or other requesters that need to read data from or write data to resources within the resource pool 12. A resource manager 16 may be incorporated within the resource management environment to avoid improper resource contentions and errors that may arise when multiple threads 14 seek to access a resource in the resource pool 12 at the same time. For example, it may be undesirable for a first thread to be permitted to write to a resource, such as a memory location, at the same time that a second thread is reading the same memory location, because the second, reading thread may unknowingly access stale or inconsistent data if the concurrent access is permitted.

FIG. 2 depicts another example resource management environment 20 including a depiction of resources within a resource pool 22. The resource pool includes a number of memory resources 24, labeled 1 to M, that may include both volatile and non-volatile memory locations, registers, as well as other memory resources. In this example, the resource pool 22 may further include a number of I/O resources 26, labeled 1 to N, that may include a multitude of input/output devices and associated read and write buffers including keyboards, pointing devices, display monitors, printers, USB devices, as well as many others. The resource management environment 20 further includes a plurality of threads 28 that seek access to resources of the resource pool. A resource manager 30 is included to manage access to the resource pool 22.

FIG. 3 depicts a prior art resource level lock environment 40 having individual locks 42 associated with each resource 44. A resource manager 46 controls access to a plurality of resources 44. A global lock 48 is used to protect the internal data structures. Each resource 44 has a separate resource lock 42 associated with the resource 44 to protect access to the resource 44.

FIG. 4 depicts a flow diagram illustrating a prior art resource management process 50 that may be used in an environment such as the environment depicted in FIG. 3. As shown at 52, the resource level lock associated with an individual resource 54 to which access is desired is acquired before each access to the resource 54. The individual resource lock is held for the entirety of the access to the resource 54, as depicted at 56. Following completion of access by the requester, the individual resource lock is released, as depicted at 58.

SUMMARY

In accordance with the teachings provided herein, computer-implemented systems and methods are disclosed for regulating access to a plurality of resources in a pool of resources without requiring individual locks associated with each resource. As an example, access to one of the plurality of resources may be requested, where a resource queue for managing threads waiting to access a resource is associated with each of the plurality of resources. A resource queue lock associated with the resource may be acquired, where a resource queue lock is associated with multiple resources. The current status of the resource may be determined from the resource queue associated with the resource. The requester may be granted access if the resource is not currently being accessed. If the resource is currently being accessed in read-mode, the resource queue is empty, and the request is a read request, the requester may also be granted access. If the resource is being accessed in a mutex-mode or if the resource queue is not empty, the requester is added to the resource queue and set in a wait state. The requester may be awoken from the wait state when the requester is first in the queue and the resource is available.

As another example, a system and method are configured to obtain mutex-mode access by a requester to a resource in a pool of resources without requiring individual locks associated with each resource. Mutex-mode access to one of the plurality of resources may be requested, where a resource queue for managing threads waiting to access a resource is associated with each of the plurality of resources. A resource queue lock associated with the resource may be acquired, where a resource queue lock is associated with multiple resources. The current status of the resource may be determined from the resource queue associated with the resource. The requester may be granted access if the resource is not currently being accessed. If the resource is being accessed, the requester is added to the resource queue and set in a wait state. The requester may be awoken from the wait state following receipt of a resource availability notice.

As an additional example, a computer-implemented system and method for regulating access to a plurality of resources in a pool of resources without requiring individual locks associated with each resources may include a plurality of resources, where each of the plurality of resources are associated with a resource queue. The system may further include a resource queue lock for regulating access to the resource queues, a resource queue having a one-to-many association with the resource queues, and a resource queue having a one-to-one relationship with resource queue locks. A request receiver may be configured to receive a request from a requester to access one of the plurality of resources. An access regulator may be configured to determine a current status of the requested resource from the resource queue associated with the requested resource, grant access to the request if the resource is not currently being accessed, grant access to the request if the resource is being accessed in a read-mode, the resource queue is empty, and the request is a read request, set the requester in a wait state and adding the requester to the resource queue if the resource is being accessed in a mutex-mode or if the resource queue is not empty, and wake the requester from the wait state when requester is first in the resource queue and the resource is available.

DETAILED DESCRIPTION

The use of individual resource locks creates an environment where great efforts and overhead are required to ensure that deadlocks and erroneous accesses do not occur. As noted above, a computing system may manage millions or more individual resources. Having each resource allocate a separate operating system lock object to manage access can be prohibitively expensive, requiring the use of large amounts of system memory and having a detrimental effect on system performance.

Figure 5:
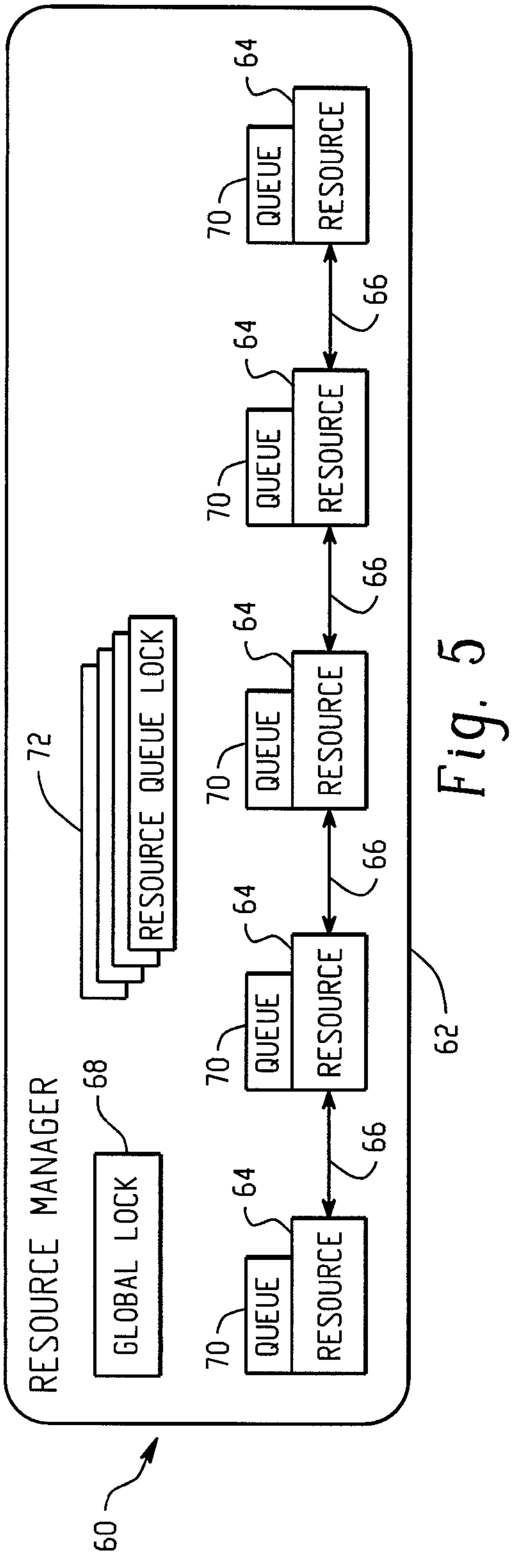
FIG. 5 depicts a resource level locking environment that provides resource level locking without individual resource locks.

FIG. 5 depicts a resource level locking environment 60 that provides resource level locking without individual resource locks. A resource manager 62 controls access to a plurality of resources 64. The plurality of resources 64 may be linked in a generic manner, as shown at 66, such that a requester is able to find a desired resource 64. Linking mechanisms 66 may include linked lists, binary trees, indexes, or other searchable mechanisms. A global lock 68 may be included to protect the internal data structures. Each resource 64 has a resource queue 70 associated with the resource 64 to manage access to the resource 64. The locking environment 60 further includes one or more resource queue locks 72, which protect access to the resource queues 70 associated with the resources 64.

A resource queue 70 provides an orderly mechanism for providing access to a resource 64 while preventing undesirable resource access conflicts. For example, in one configuration, it may be desirable to allow multiple requesters to access a resource 64 simultaneously in a read-mode. Because each requester is only permitted read access, the contents of the resource 64 cannot be changed, ensuring each reading requester accesses the most current and correct resource data. Conversely, it may be desirable to only allow a single requester to have write or read/write access to a single resource 64. Such access may be referred to as mutual-exclusive (mutex) access. Preventing any other requesters from accessing a resource 64 while a first requester has mutex access prevents the other requesters from unknowingly reading stale or erroneous data from the mutex accessed resource 64.

Thus, upon a request to access a resource 64, the state of the resource 64 and its associated resource queue 70 may be examined to determine the current status of the resource and proper handling of the request. For example, if the request is a read request, the resource queue 70 is empty, and the resource 64 is available for read access (i.e., the resource is not being accessed by any other requesters or read access has been granted to one or more other requesters), then the new request may be immediately granted. Similarly, if the request is a mutex request, the resource queue 70 is empty, and the resource 64 is available for mutex access (i.e., the resource is not being accessed by any other requesters), then the new request may be granted.

Additionally, if the request is a read request and the resource queue 70 is not empty or the resource 64 is being accessed by another requester in mutex mode, then the new request may be placed at the end of the resource queue 70 and the requester may be placed into a wait state. Further, if the request is a mutex request and the resource queue 70 is not empty or the resource 64 is being accessed by another requester, then the new request may be placed at the end of the resource queue 70 and the requester may be placed in a wait state. In one configuration, a requester may be placed into a wait state through activation of a wait structure associated with the requester. A requester may be awakened from a wait state in a variety of ways such as via a post to the associated wait structure by a prior requester after the prior requester has completed access, making the resource available to a waiting requester at the front of the resource queue 70.

Each resource queue lock 72 is associated with a plurality of resource queues 70 such that only one requester may modify a resource queue 70 associated with a particular resource queue lock 70 at a time. To alleviate contention for access to the resource queues 70, multiple resource queue locks 72 may be utilized, each resource queue lock 72 having a one-to-many association with the resource queues 70 while each resource queue 70 has a one-to-one association with a resource queue lock 72. In this manner, a limited number of resource queue locks 72 may protect access to many resource queues 70 without creating a processing bottleneck. If such a bottleneck in contention for resource queue locks 72 is discovered, the number of resource queue locks 72 may be increased.

Figure 6:
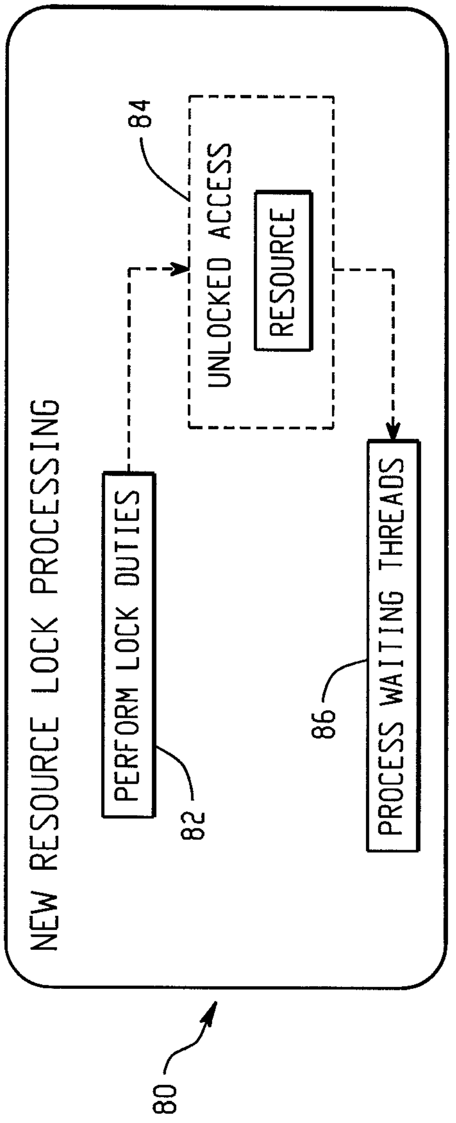
FIG. 6 depicts a flow diagram illustrating a resource management process that obviates the need for individual resource locks.

FIG. 6 depicts a flow diagram illustrating a resource management process 80 that obviates the need for individual resource locks. Such a process may be used in conjunction with the resource level locking environment depicted in FIG. 5 to mimic the functionality of holding an individual resource lock for each resource access without requiring the memory and processing overhead of individual resource locks associated with each resource. As depicted at 82, locking duties are performed prior to resource accessing. For example, a global lock may be acquired followed by a resource queue lock acquisition for determination of the status of the desired resource. As described above, based on the type of request and the current resource status, the request may be immediately granted or the requester may be placed into a resource queue associated with the resource. Following this determination, the global and resource locks may be released and further access to the resource may be managed in an unlocked state, as depicted at 84, through utilization of the resource queue.

Figure 1:
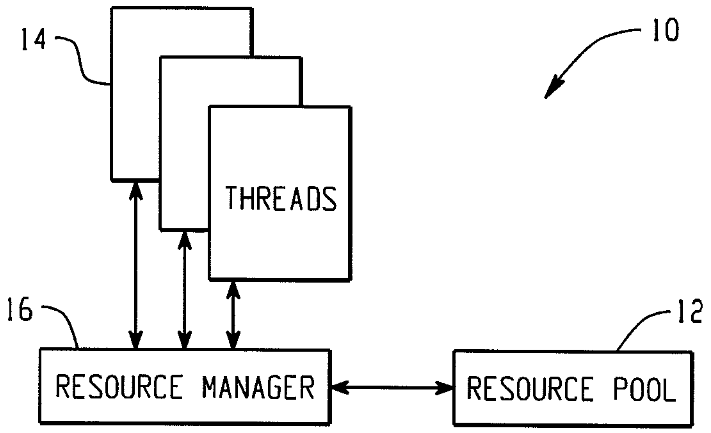
FIG. 1 depicts an example resource management environment.
Figure 2:
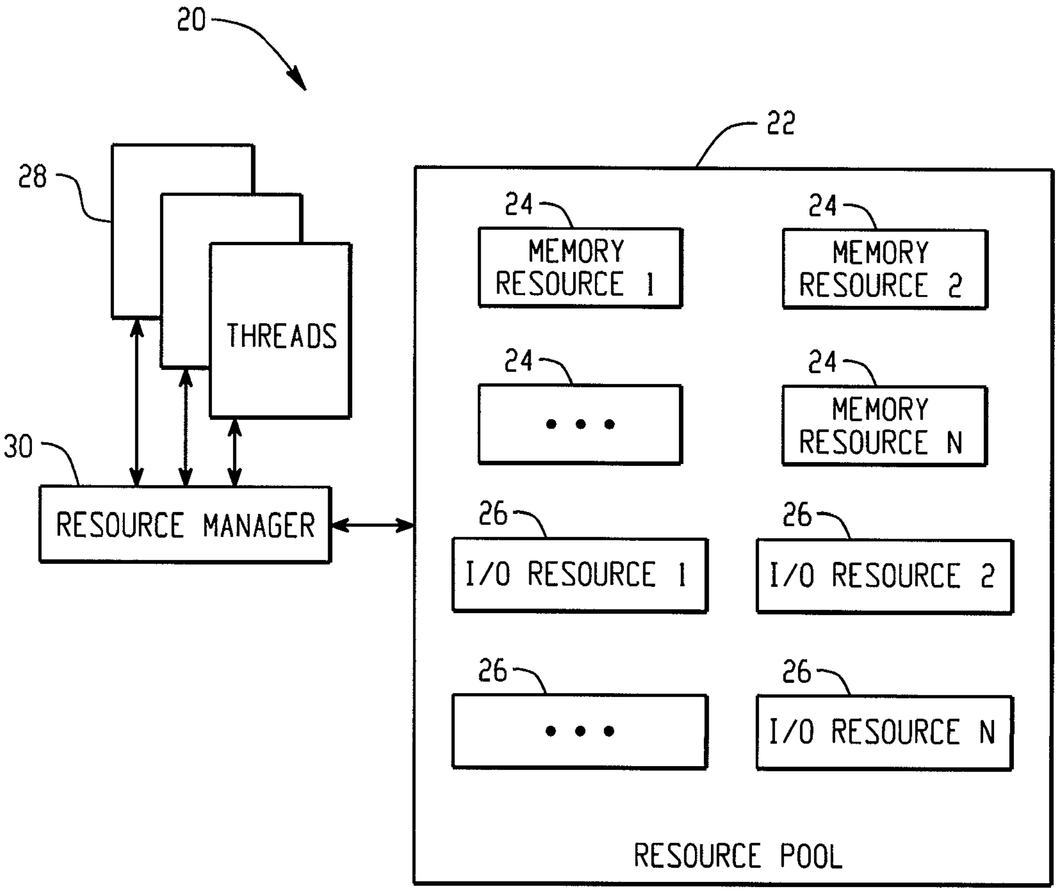
FIG. 2 depicts another example resource management environment including a detailed depiction of a resource pool.
Figure 3:
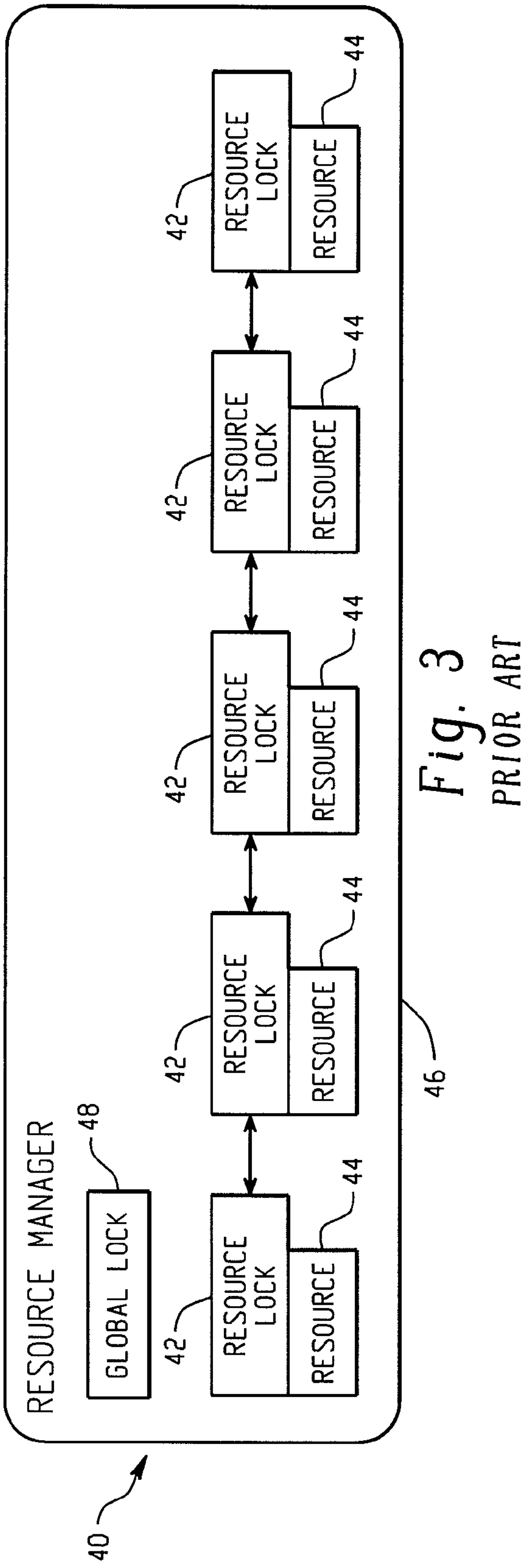
FIG. 3 depicts a prior art resource level lock environment having individual locks associated with each resource.
Figure 4:
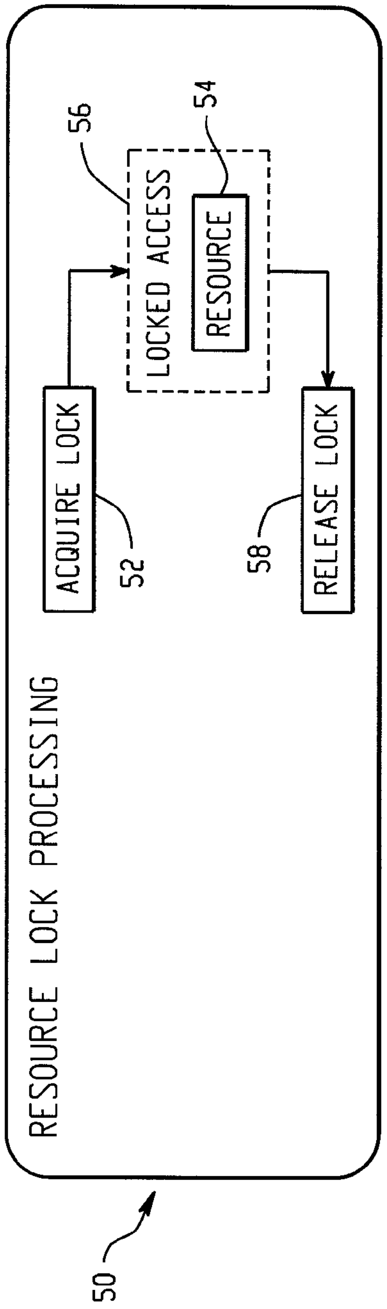
FIG. 4 depicts a flow diagram illustrating a prior art resource management process.

The process of FIG. 6 is in stark contrast to the process described with reference to prior art FIG. 4, where an individual resource lock must be retained throughout the entirety of a resource access. Instead, the process of FIG. 6 enables an orderly management of resource accesses such that accessing requesters fulfill their requests followed by processing of waiting threads, as depicted at 86, without further acquisition or holding of locks during their accessing. The process of FIG. 6 eliminates individual resource level locks by mimicking the functionality provided by these locks while offering a potential savings of space and increased performance over prior methods.

Figures 7, 8:
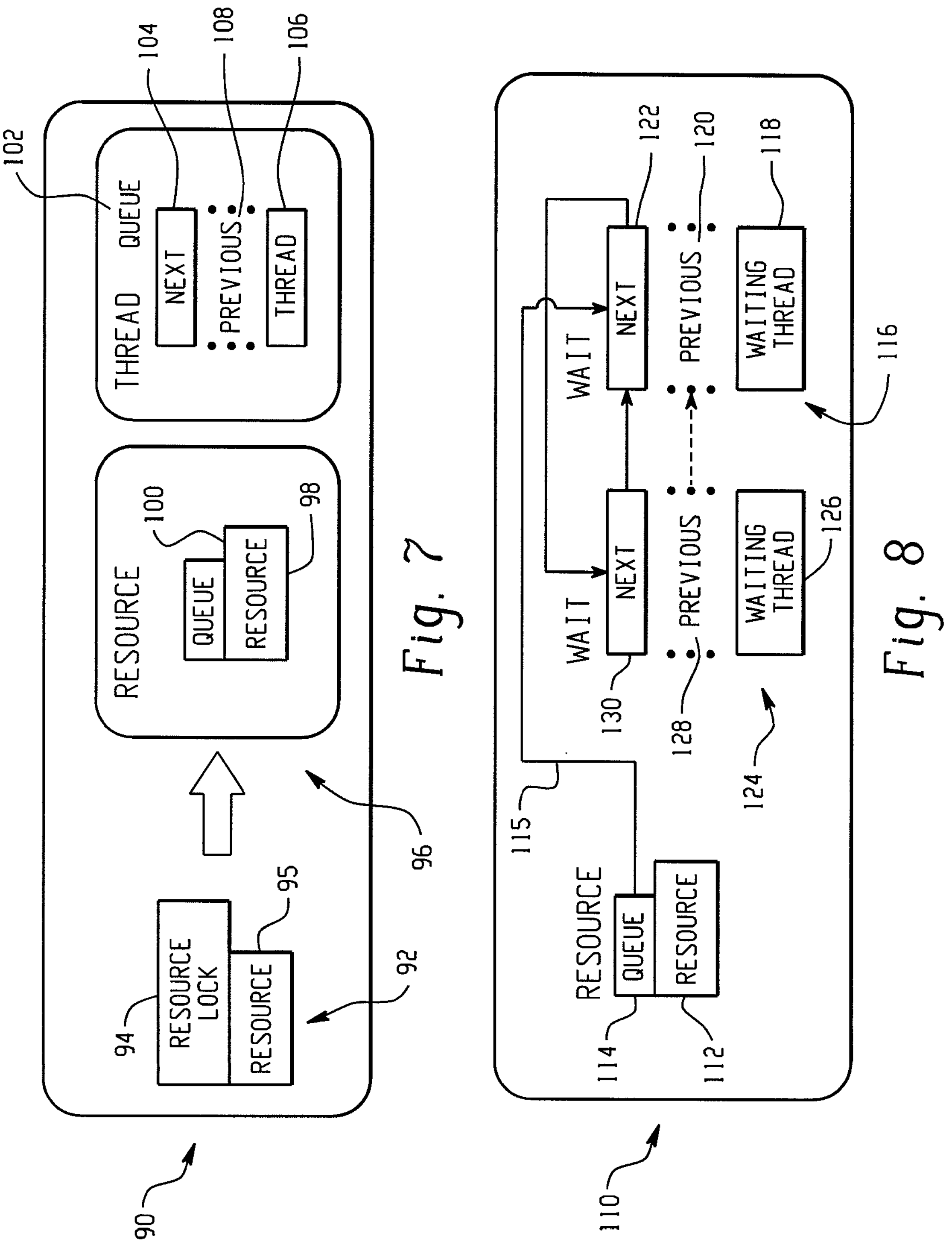
FIG. 7 depicts example contents of a resource queue and the associated savings over prior art systems using individual resource locks.
FIG. 8 depicts contents of an example resource queue.

FIG. 7 depicts example contents of a resource queue and the associated savings over prior art systems using individual resource locks. The traditional configuration is shown at 92, where a large individual resource lock 94 is associated with each resource 95. In contrast, an alternate configuration is depicted at 96, where, in place of a resource lock, each resource 98 is associated with a small resource queue structure 100 to manage the waiting threads. The resource queue 100 may be constructed in a variety of forms, such as a linked list. For example, each resource queue 100 may be configured to contain thread queue records 102 containing information about requesters waiting in the resource queue 100. A thread queue record 102 may contain a 'next' pointer field 104 for identifying a next thread queue record 102 in the resource queue 100 and a thread pointer 106 for identifying the requester associated with the thread queue record 102. If functionality is incorporated that allows an access request to time out and be removed from the resource queue 100, a previous thread queue record pointer 108 may be included to enable a thread queue record 102 to be removed from the resource queue 100 without affecting the integrity of the resource queue 100.

Management of the resource queue 100 may require that requesters have a means of self waiting, or sleeping. Waiting threads may be signaled to continue processing by another thread. Some modern operating systems provide this functionality. If not, a separate event may be created and assigned to each thread at thread creation time. Threads may then wait on this event and other threads may post to this event to awaken them. The number of threads created, and thus possibly requiring a separate event, is often much smaller than the number of resources in a managed resource space. Thus, even if separate per thread events are created, overall space savings are usually achieved over using an individual lock per resource.

FIG. 8 depicts contents of an example resource queue. A system resource 112 has an association with a resource queue 114. The resource queue 114 contains a pointer 115 to the first thread queue record 116. The first thread queue record 116 includes a thread pointer 118 to the requesting thread associated with the first thread queue record 116. The first thread queue record 116 may also contain a previous thread queue pointer 120 if request timeout capabilities are available. The previous thread queue pointer 120 for the first thread queue record 116 may be set to null because no thread queue records precede the first thread queue record 116 in the resource queue 114. The first thread queue record 116 also may include a next thread queue pointer 122 for identification of a next thread queue record 124 in the resource queue 114. The next thread queue record 124 includes a thread pointer 126 to the requesting thread associated with the next thread queue record 124, a previous thread queue pointer 128 pointing to the first thread queue record 116, if the previous thread queue pointer 128 is present, and a next thread queue pointer 130, which may be null or point to the previous thread queue record 116 in the example of FIG. 8, where no thread queue records follow the next thread queue record 124.

Figure 9:
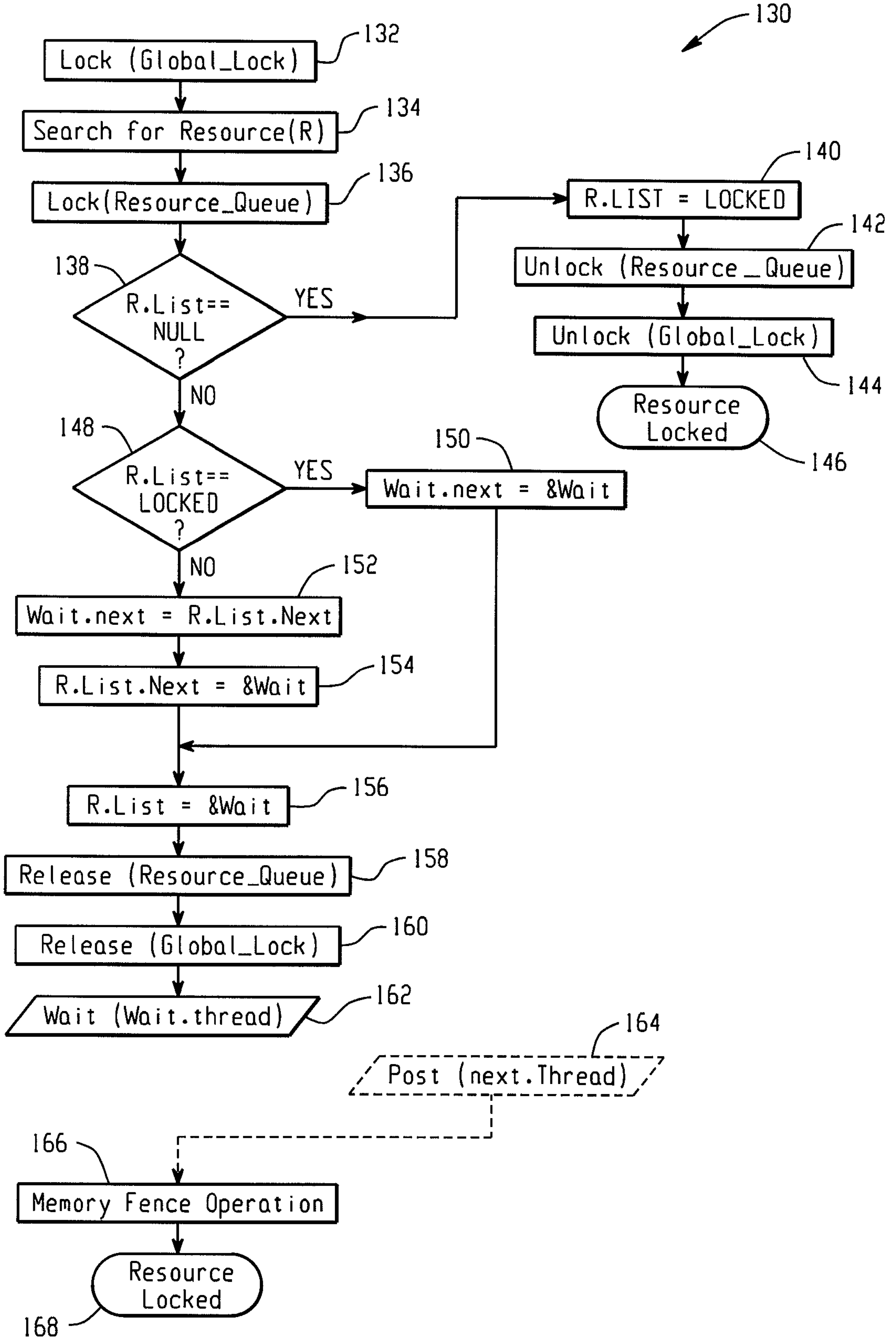
FIG. 9 depicts a flow diagram illustrating the acquisition of mutex access to a resource by a requester.

FIG. 9 depicts a flow diagram illustrating the acquisition of mutex access to a resource by a requester in a system where all requests are mutex requests. Processing begins by acquiring the global lock as shown at 132, allowing protected searching of the resource data store. The global lock may be acquired in either shared or mutex mode. Following acquisition of the global lock, the desired resource (R) is searched for and located at step 134. This searching may be through traversal of links between resources, shown in FIG. 5, or via other searching mechanisms. Once the resource has been located, the resource queue lock associated with the resource is acquired at step 136. The status of the resource is examined at step 138 through an examination of the resource queue pointer (R.List) associated with the located resource. If the resource is currently inactive, as denoted by the resource queue list pointer being NULL, the resource is set to a locked with no waiters state, as shown at 140. The resource queue lock is then released at 142 and the global lock is released at 144, and the resource has been locked by the requesting thread, as shown at 146.

If the resource is deemed busy, as shown by a non-Null pointer at 138, then the list of waiting threads is created or increased. If the resource does not currently have a wait list in its resource queue, as determined by an examination of the resource queue at 148, then a thread queue record associated with the requester is initialized to point to itself as shown at 150. If a wait list is already existing in the resource queue, then the list is managed by initializing a thread queue record to point to the head of the wait list, as shown at 152, and the thread queue record associated with the request at the end of the list is set to point to the new waiting requester's thread queue record, as shown at 154. The resource queue lock is released at 158, and the global lock is released at 160. A wait function is then called, as shown at 160, to set the requester to sleep until the resource becomes available when the requester is at the front of the resource queue.

A requester may be awoken, as shown at 164, by a post to its wait structure. It should be noted that FIG. 9 depicts an implementation without a wait timeout feature that enables removing of a requester from a wait list. Incorporation of the wait timeout feature would utilize the additional previous pointers described above with respect to FIG. 8 in the thread queue record and additional post wait function processing to determine the cause of the wait condition being satisfied. Following a post operation 164, a memory fence operation may be performed at step 166 to ensure a consistent view of possible changes to the resource. This memory fence operation may be a specific CPU instruction or may be generically performed using the resource queue lock, as acquiring and releasing the resource queue lock may be configured to include a memory fence operation. The resource has then been effectively locked, as shown at 168. As noted previously, no additional locking steps are necessary following the releases of steps 142, 144 or 158, 160 until the completion of the requester's access to the resource, allowing resource access to be accomplished without holding an individual resource lock.

Following is example pseudo-code for mutex resource lock acquisition:

```
- Lock( global__lock )
- Resource = search__for__resource( )
- if( Resource.List == NULL ) then
    - Resource.List = LOCKED
    - Release( global__lock )
- else
    - if( Resource.List == LOCKED )
        - Wait.Next = &Wait;
    - else
        - Wait.Next = Resource.List.Next // Head of queue
        - Resource.List.Next = &Wait
    - Resource.List = &Wait // Tail of queue
    - Release( global__lock )
    - Sleep( )
    - Lock( global__lock ) // This can be changed to a memory
    fence operation
    -// process timeout (if implemented)
    - Release( global__lock )
- // At this point a single thread has access to the 'locked' resource.
```

Figure 10:
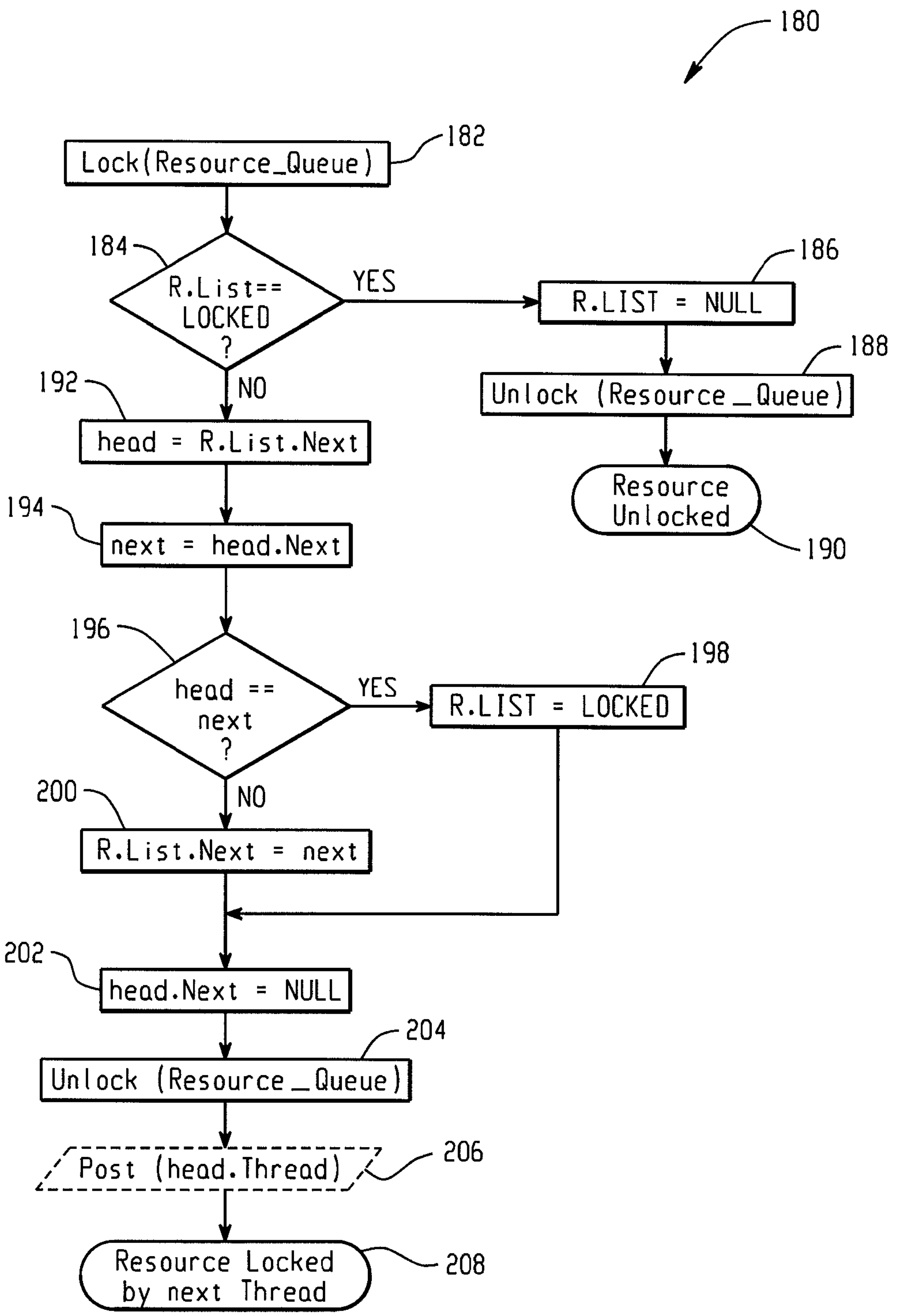
FIG. 10 depicts a flow diagram illustrating the release of a mutex lock.

FIG. 10 depicts a flow diagram illustrating the release of a mutex lock. The resource queue lock associated with the resource is acquired at 182. If there are no waiting threads, then the resource queue pointer will be equal to LOCKED, as shown at 184. If this is true, then the resource queue pointer is cleared at 186, the resource queue lock is released at 188, and the resource is unlocked, as shown at 190.

If there are other threads waiting in the resource queue, then the next thread in the queue is noted as being at the head of the queue as shown at 192. The next requester in the resource queue is also identified via the head requester's thread queue record next field at step 194. If head and next are deemed equal by the comparison at step 196, then only a single requester remains in the resource queue. A single waiting requester is indicated by setting the resource queue pointer to LOCKED as shown at 198. However, if additional requesters are present in the resource queue, then the head entry is removed from the resource queue by pointing the resource queue next pointer to the next thread queue record as shown at 200. The head.next pointer is then cleared at 202 and the resource queue is unlocked at 204. The next request in the resource queue is then awoken at 206, and the resource has been successfully released, as shown at 208.

Following is example pseudo-code for mutex resource lock release:

```
- Lock( global__lock )
- if( Resource.List == LOCKED )
    - Resource.List = NULL
- else
    - head = Resource.List.Next
    - next = head.Next
    - if( head != next )
        - Resource.List.Next = next // establish new head of queue
    - else
        - Resource.List = LOCKED
    - Release( global__lock );
    - Signal( next.Thread ) // Signal after lock release
-// The thread has de-registered its 'lock' of the resource; any next
thread is awoken to claim the resource 'lock.
```

Figure 11:
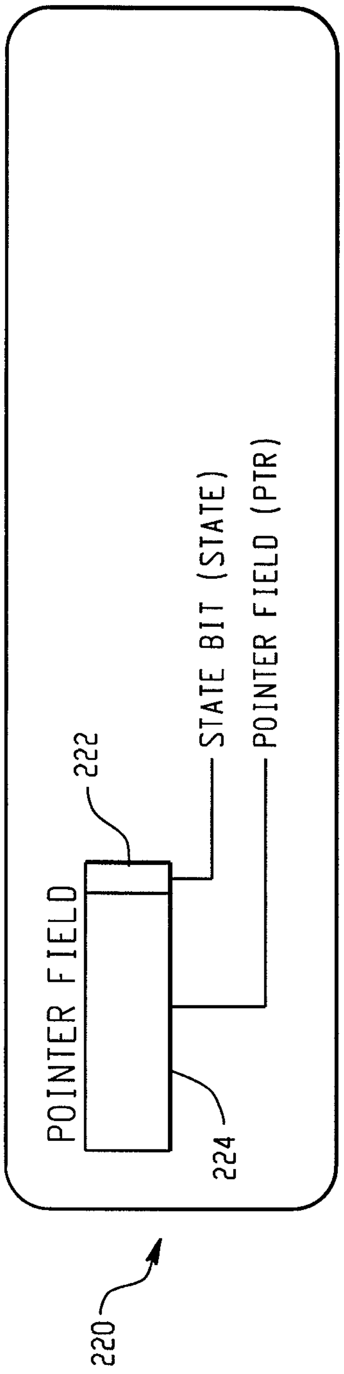
FIG. 11 depicts the incorporation of a request type state bit at the end of a next pointer in a thread queue record.

In a system that supports both mutex and read only access to resources, the resource queue and associated pointers may include additional features for handling this added complexity. For example, FIG. 11 depicts the incorporation of a request type state bit 222 at the end of a next pointer 224 in a thread queue record. The inclusion of the request type state bit 222 enables fast identification of the nature of the next resource access request (i.e., mutex, read-only, etc.).

Figure 12:
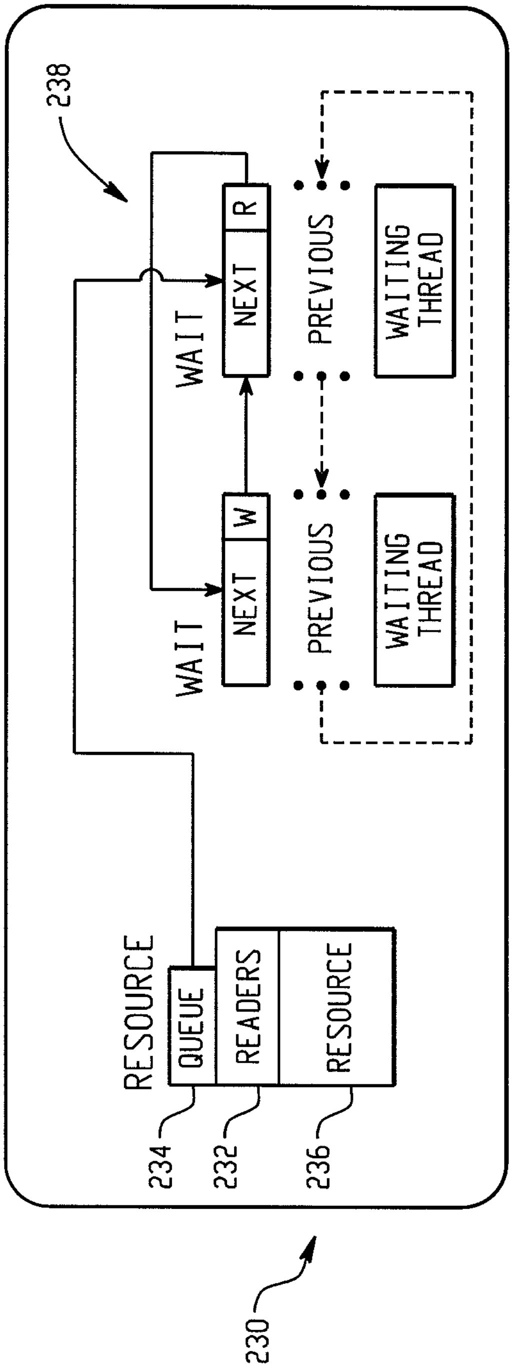
FIG. 12 depicts a resource queue that includes a readers counter identifying the number of requesters currently having read access to the resource.

In a resource environment supporting both mutex-mode and read-mode access, the resource queue may also include one or more counters for tracking status indicators. As noted above, it may be desirable to allow multiple requesters to acquire read-only access to a resource at the same time. FIG. 12 depicts a resource queue that includes a readers counter 232 identifying the number of requesters currently having read access to the resource. As shown in FIG. 12, a resource queue 234 is associated with a memory or I/O resource 236. In addition to a linked list 238 of waiting requesters, a reader counter 232 is also associated with the resource queue 234 and the resource 236. Additional counters that may be associated with the resource queue 234 include a counter identifying the number of requesters waiting in the resource queue, as well as others.

Figure 13:
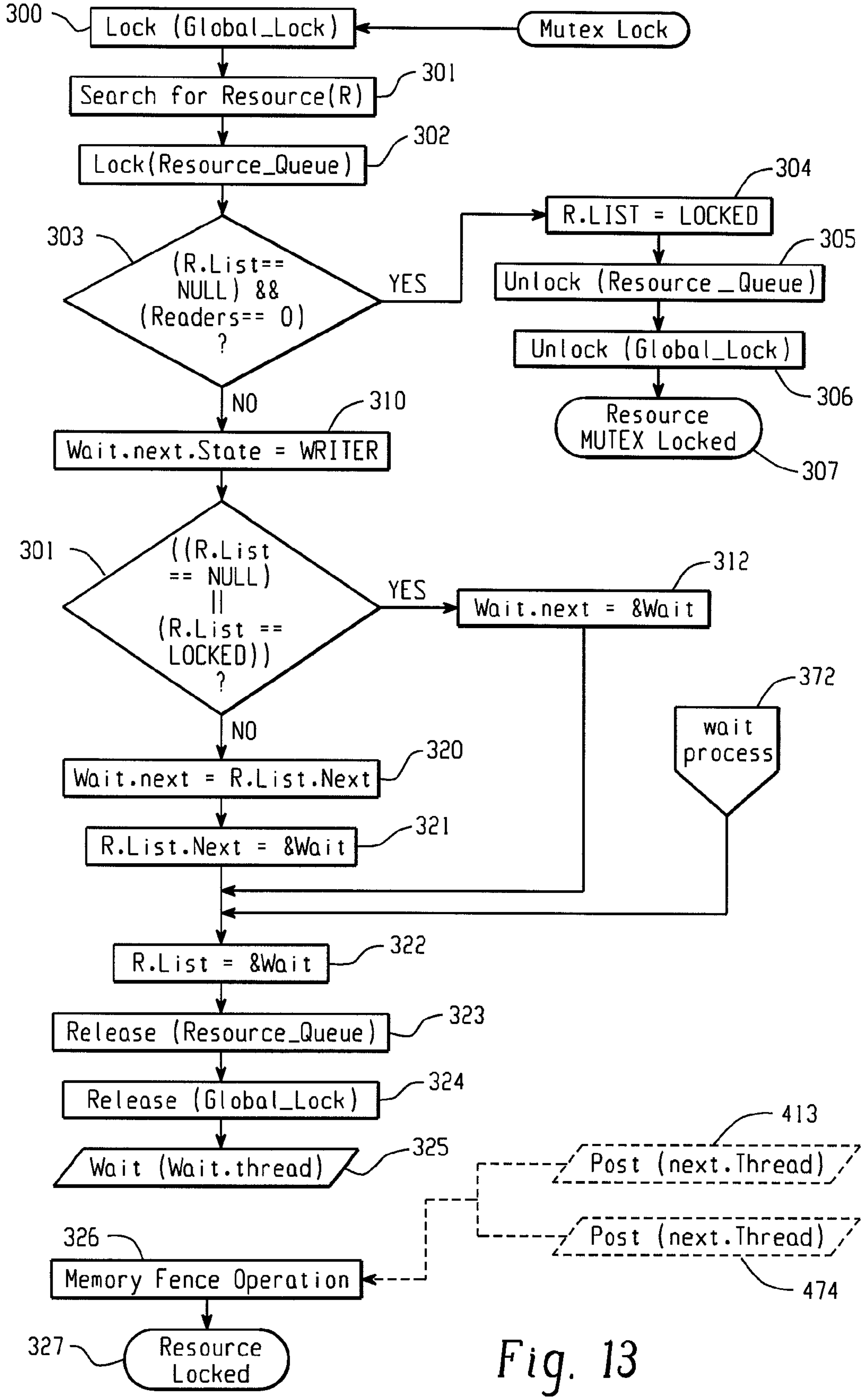
FIG. 13 depicts a flow diagram illustrating the acquisition of mutex access to a resource by a requester in a system where both mutex requests and read requests are supported.

FIG. 13 depicts a flow diagram illustrating the acquisition of mutex access to a resource by a requester in a system where both mutex requests and read requests are supported. As shown at 300, processing begins by acquiring the global lock, allowing protected searching of the resource data store. The global lock may be acquired in either shared or mutex mode. The resource is then searched for and located at 301 and a resource queue lock associated with the located resource is acquired at 302. The status of the resource is determined at 303. If the resource is currently inactive, denoted by the resource queue pointer being null and having a reader counter value of zero, then the resource is set to the locked with no waiters state by setting the resource list pointer to the LOCKED state at 304. The resource queue is unlocked at 305, the global lock is relinquished at 306, and the resource is then mutex locked as shown at 307.

If the determination at 303 does not show the resource as being inactive, then the 'No' branch is taken. Finding the resource currently busy, the mode of the wait request is set to WRITER based on the request being a mutex request. Because the resource is busy, the resource queue of waiting threads is created or lengthened. If the resource does not currently have a wait list, then the thread queue record associated with the current request is initialized to point to itself as illustrated at 312. If a resource queue already exists and is populated, then the thread queue record associated with the current request is initialized to point to the head of the wait list, as shown at 320. The thread queue record associated with the requester at the end of the list is then set to point to the new waiting thread, as shown at 321. The wait structure is then appended to the end of the resource wait queue at 322. Both the resource queue lock and the global lock are released as shown at 323 and 324, respectively, and the wait function is called at 325 to sleep until the resource becomes available.

Figure 15A:
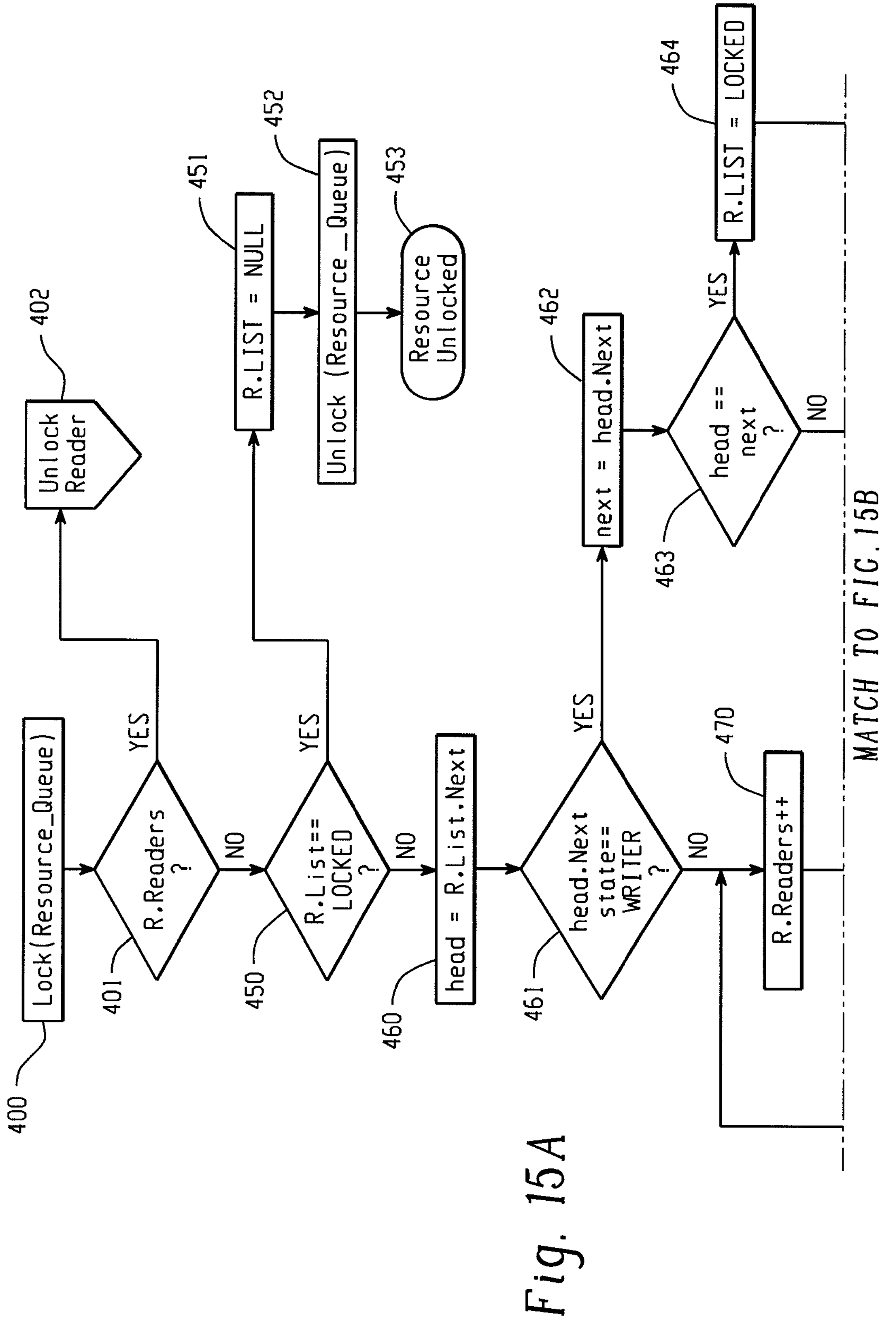
FIGS. 15A and 15B depict a flow diagram illustrating the release of a resource lock that may be shared.
Figure 15B:
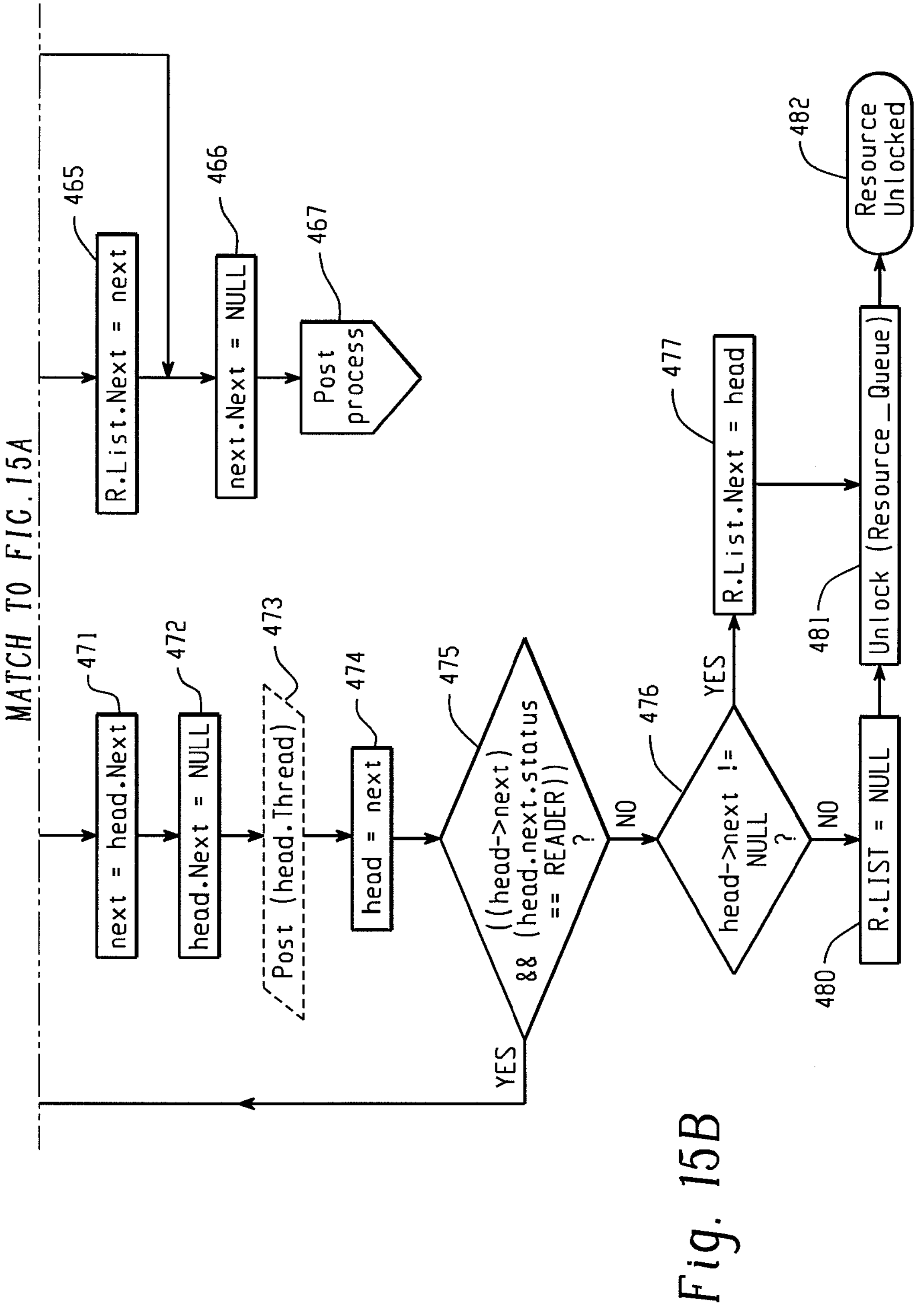
Figure 16:
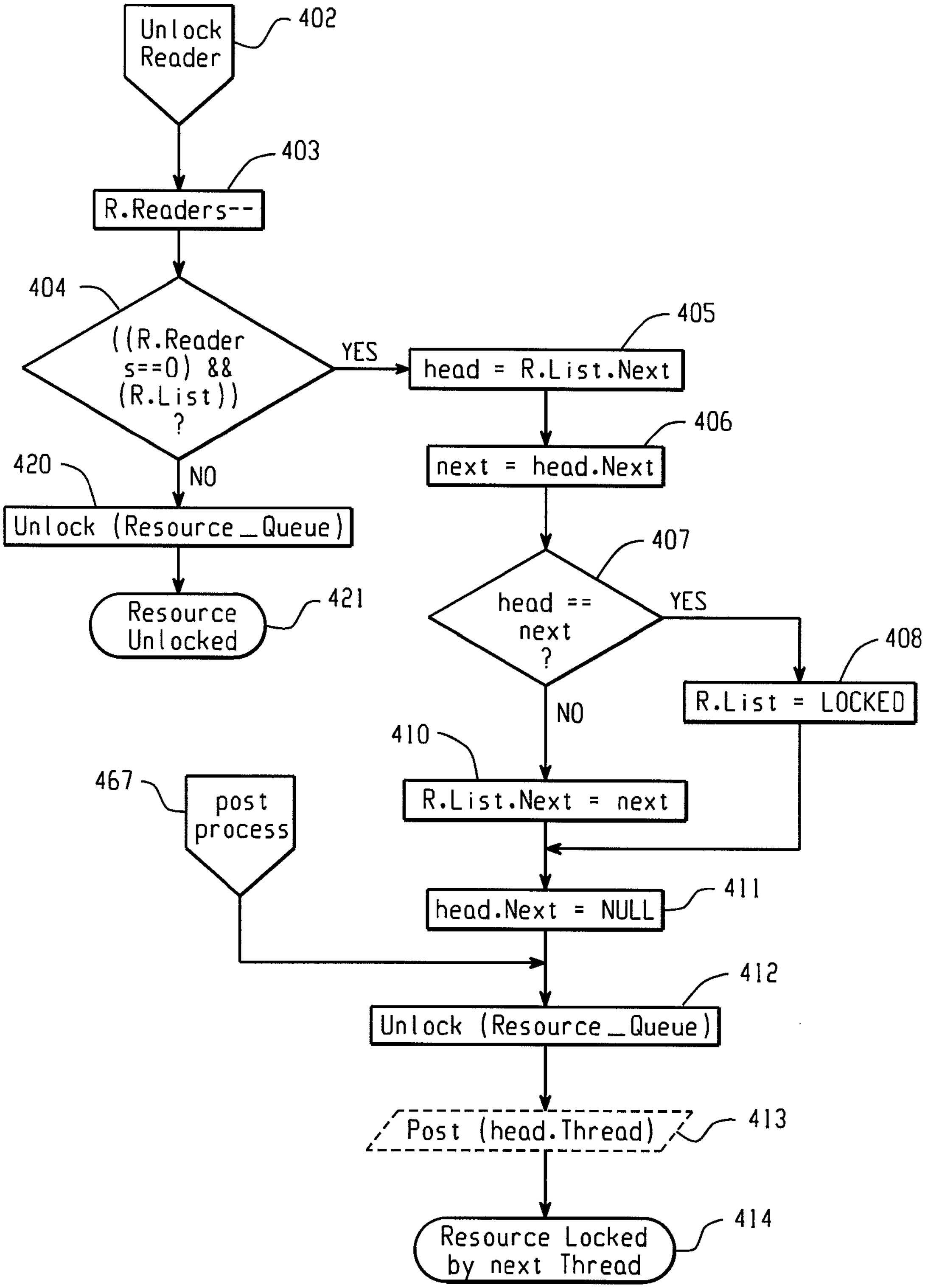
FIG. 16 is a flow diagram illustrating the release of a shared resource lock in shared mode.

A thread may be awoken via a post, shown at 474 and 413, further described with respect to FIGS. 15A-15B and 16, respectively. A memory fence operation may be performed at 326 to ensure a consistent view of possible changes to the resource. The lock has then been successfully acquired by the thread as shown at 327.

Figure 14:
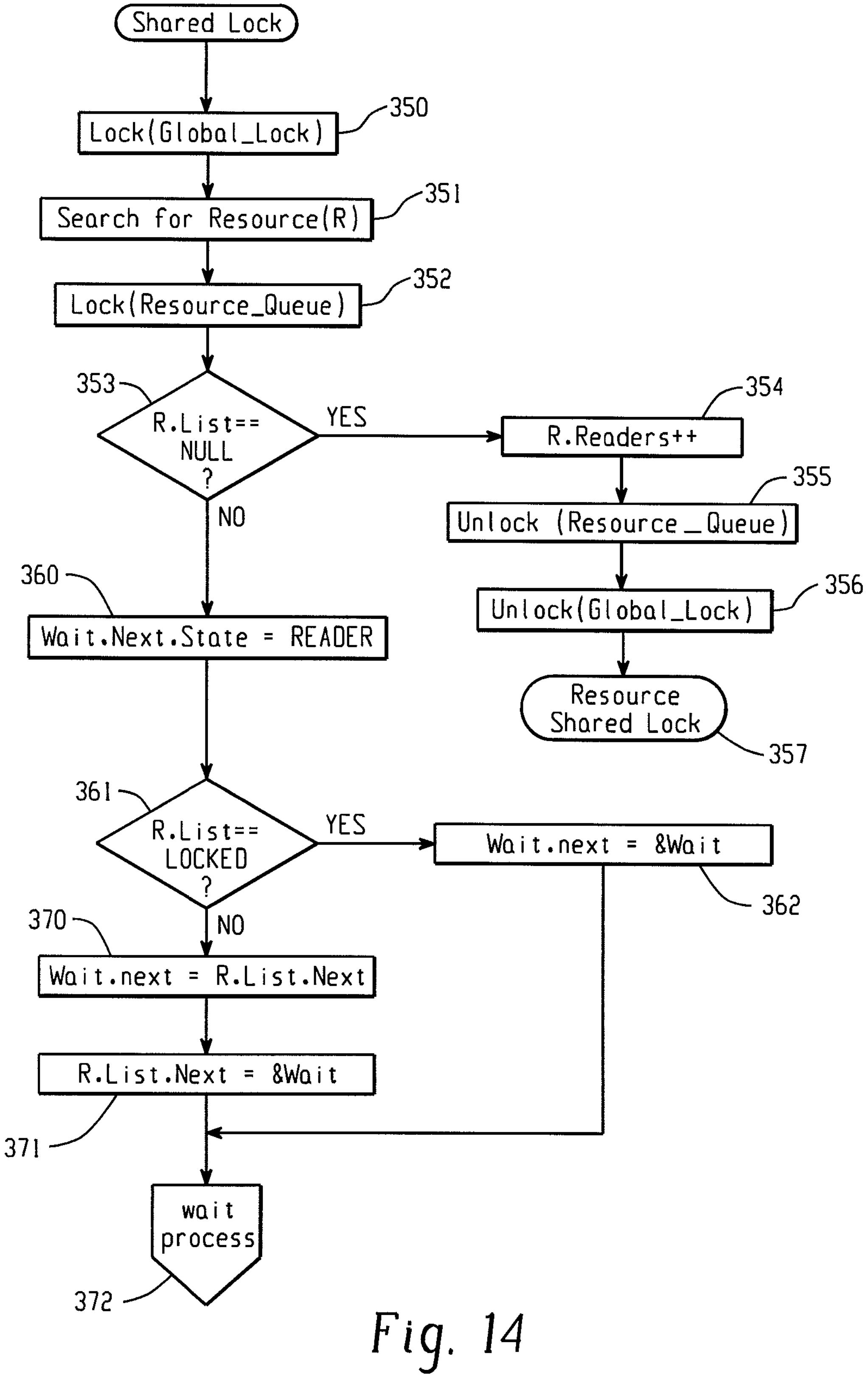
FIG. 14 depicts a flow diagram illustrating the acquisition of read access to a resource by a requester in a system where both mutex requests and read requests are supported.

FIG. 14 depicts a flow diagram illustrating the acquisition of read access to a resource by a requester in a system where both mutex requests and read requests are supported. A global lock is acquired at 350 allowing protected searching of the resource data store. Once the resource has been located at 351, the resource queue lock associated with the located resource is acquired in mutex mode at 352. If the resource is currently inactive or has no waiting requests in the queue, as determined by evaluating whether the resource queue pointer is null at 353, then the resource reader counter is incremented at 354, the resource queue lock is released at 355, and the global lock is released at 356. The resource is then in a shared, read lock state, as illustrated at 357.

If waiting threads are found, or if the resource is locked for mutex access, then the mode of the next wait request is set to READER at 360. A check is made at 361 to determine if other requesters are waiting in the resource queue. If the resource does not currently have any waiting requesters, as denoted by the resource queue pointer being in the LOCKED state, then the current requester's thread queue record is initialized to point to itself, as shown at 362. If other requesters are waiting in the resource queue, then the current requester's thread queue record is initialized to point to the front of the list at 370, and the thread queue record of the last thread in the resource queue has its pointer set to point to the new requester at 371. The read request then performs a wait process at 372 by appending the wait structure to the end of the wait queue and by releasing the resource queue lock and the global lock and calling the requester's associated wait function.

Following is example pseudo-code for shared resource lock acquisition:

```
- Lock( global__lock )
- Resource = search__for__resource( )
- if( WRITE__LOCK )
    - if( (Resource.List == NULL) && (Readers == 0) ) then
        - Resource.List = LOCKED
        - Release( global__lock );
    - else
        - Wait.Next.state = WRITER
        - if( Resource.List == NULL ) then
            - Wait.Next = &Wait
        - else
            - Wait.Next = Resource.List.Next // Head of queue
            - Resource.List.Next = &Wait
        - Resource.List = &Wait // Tail of queue
        - Release( global__lock )
        - Sleep( )
        - Lock( global__lock ) // This can be changed to a memory
        fence operation
        - // process timeout (if implemented)
        - Release( global__lock )
        - // At this point a single thread has access to the 'locked'
        resource.
- else
    - if( Resource.List == NULL )
        - Resource.Readers++
        - Release( global__lock )
    - else
        - Wait.Next.state = READER
        - if( Resource.List == LOCKED ) then
            - Wait.Next = &Wait
```

-continued

```
        - else
            - Wait.Next = Resource.List.Next // Head of queue
            - Resource.List.Next = &Wait
        - Resource.List = &Wait // Tail of queue
        - Release( global__lock )
        - Sleep( )
        - Lock( global__lock ) // This can be changed to a memory
        fence operation
        - // process timeout (if implemented)
        - Release( global__lock )
- // At this point the Resource can be safely accessed in the
appropriate mode.
```

FIGS. 15A and 15B depict a flow diagram illustrating the release of a resource lock that may be shared. Processing begins by acquiring the resource queue lock at 400. At 401, a determination is made as to whether there are other active readers, and thus, whether the resource is in a shared mode. Shared mode lock release will be discussed below with reference to FIG. 16. If the resource is not in a shared mode, then a determination is made into whether there are other requesters present in the resource queue at 450. If there are no waiting requesters, then the resource queue pointer will be equal to LOCKED. If that is true, then the resource queue pointer is set to NULL at 451, the resource queue lock is released at 452, and the resource has been successfully released by the requester, as shown at 453.

If other requesters are present in the resource queue, then the head of the resource queue is identified at 460. The type of request at the head of the list is examined at 461. If the lock request mode of the first requester in the resource queue is WRITER, then the next pointer is determined at 462. If there is only one requester left in the queue, then the resource queue pointer is set to LOCKED, as shown at 464. Otherwise, at 465, the second request in the queue is moved up to the front of the list at 465. The post process then continues at 467, which is further discussed below with reference to FIG. 16.

Processing differs if the determination at 461 identifies the next request in the resource queue as a read request. Because multiple read requests may access a resource at the same time, read requests at the front of the resource queue are permitted to access the resource until the resource queue is empty or a mutex request is encountered in the resource queue. When a read request is at the front of the resource queue, the readers counter is incremented at 471, the second requester in the resource queue is moved to the front at 471, 472, and the read request to be granted access is awoken via a post to its wait structure at 473. An examination is then made at 475 to determine if the next request in the resource queue is a read request. If it is, then the loop 470-475 is repeated.

If the next request in the resource queue is not a read request, then a determination is made at 476 as to whether there are additional requests in the queue. If there are additional requests, then the resource queue head pointer is updated at 477, otherwise the resource queue is set to null at 480. The resource queue lock is relinquished at 481, and the resource is unlocked.

FIG. 16 is a flow diagram illustrating the release of a shared resource lock in shared mode. Processing begins at 402 after a determination that the resource is releasing a shared mode lock, described above with respect to FIG. 15A at 401. At 403, the resource reader counter is decremented. If there are still requesters reading the resource or if the resource queue is empty, then the resource queue may be released at 420 and the unlocking requester has disassociated itself from the resource as shown at 421. If there are no more requesters reading the resource and the resource queue is not empty, then the first and second requesters in the resource queue are identified at 405 and 406, respectively. If there is only one requester left in the list, then the resource queue pointer is set to LOCKED. Otherwise, the second requester in the resource queue is moved to the front of the list. Post processing then begins by releasing the resource queue lock and posting to the wait structure of the requester at the head of the resource queue at 413. The resource is then locked for access by the next thread, as depicted at 414.

Following is example pseudo-code for shared resource lock release:

```
- Lock( global__lock )
- if( Resource.Readers != 0 ) // Release reader instance
    - Resource.Readers--
    - if( (Resource.Readers == 0) && (Resource.List != NULL) )
        - head = Resource.List.Next
        - next = head.Next
        - if( head != next )
            - Resource.List.Next = next // Establish new head
        - else
            - Resource.List = LOCKED
        - Release( global__lock )
        - Signal( next.Thread )
    - else
        - Release( global__lock )
- else // Release writer instance
    - if( Resource.List == LOCKED )
        - Resource.List = NULL
        - Release( global__lock )
    - else
        - head = Resource.List.Next
        - next = head.Next
        - if( head.Next.state == WRITER )
            - if( head != next )
                - Resource.List.Next = next // Establish new head
            - else
                - Resource.List = LOCKED
            - Release( global__lock )
            - Signal( next.Thread )
        - else
            - Resource.Readers = 1
            - while( (next != head) && (next.Next.state == READER) )
                - Resource.Readers++
                - next = next.Next
            - if( next != head )
                - Resource.List.Next = next // Establish new head
            - else
                - Resource.List = NULL
            - count = Resource.Readers
            - Release( global__lock )
            - do
                - Signal( Head.Thread )
                - Head = Head.Next
                - count--
            - while( count )
                -
                - if( next.Next.state = WRITER )
                    - ReaderCount++
                    - next = next.Next
- // The thread has de-registered its 'lock' of the resource.
- // If this is a reader release operation and the count has gone to zero,
  the next waiting thread is a writer request. The next waiting writer
  request thread is signaled.
- // If this is a writer release operation and the next waiting thread is a
  writer request, the next waiting writer request thread is signaled.
// If this is a writer release operation and the next waiting thread is a
reader request, all waiting reader request threads up to the first waiting
writer request thread are signaled. If there is no waiting writer request
thread than the entire list of waiting reader request threads are signaled.
```

Additionally, a resource manager may manage the insertion, deletion, and finding of resources within a resource pool. For example, the insert function enables a resource manager to populate the resource pool with individual resources. This is generally accomplished by acquiring the global lock, searching to determine the location for the new resource, followed by procedures for inserting the object into the underlying search data structure. Only the global lock is required to be held as it protects the access to the search data structure and the individual resources search keys.

The delete function enables a resource manager to remove resources. The delete operation is accomplished by acquiring the global lock and searching to determine the location of the affected resource. The found object state is modified to indicate a deleted state. The resource lock is obtained. If the resource is currently available, it may be removed from the search data structure. If the resource is not available (i.e., visible by other threads), the delete requester simply places itself on the list of waiting threads as a MUTEX requester. No further threads will follow it, as the global status of the resource was marked deleted and would not be found by future search operations. After being awoken, the delete processing acquires the global lock and removes the resource from the search data structure. The resource object may then be deleted.

Figure 17:
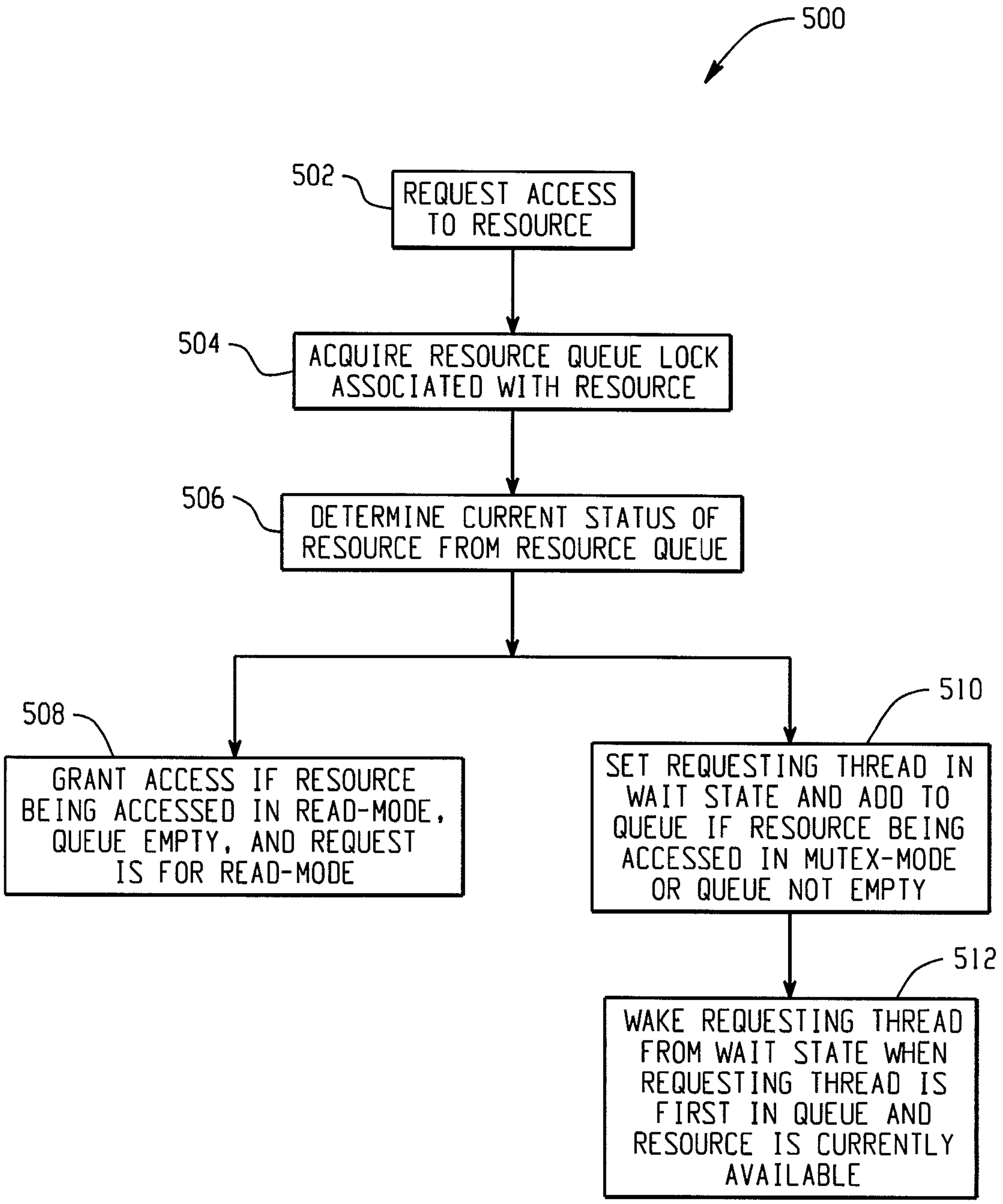
FIG. 17 is a flow diagram for a computer-implemented method of regulating access to a plurality of resources in a pool of resources without requiring individual locks associated with each resource.

FIG. 17 is a flow diagram for a computer-implemented method of regulating access to a plurality of resources in a pool of resources without requiring individual locks associated with each resource. At 502 access is requested to one of the plurality of resources by a requester, where a resource queue for managing threads waiting to access a resource is associated with each of the plurality of resources. At 504, a resource queue lock associated with the located resource is acquired, where a resource queue lock is associated with multiple resources. At 506, the current status of the resource is determined from the resource queue associated with the processor. Access is granted to the requester if the resource is not currently being accessed, as shown at 508 or if the resource is currently being accessed in read-mode, the resource queue is empty, and the request is a read request. At 510, the requester is added to the resource queue and the requester is set into a wait state if the resource is being accessed in mutex-mode or if the resource queue is not empty. At 512, the requester is awoken from its wait state when the requester is first in the resource queue and the resource is available.

Figure 18:
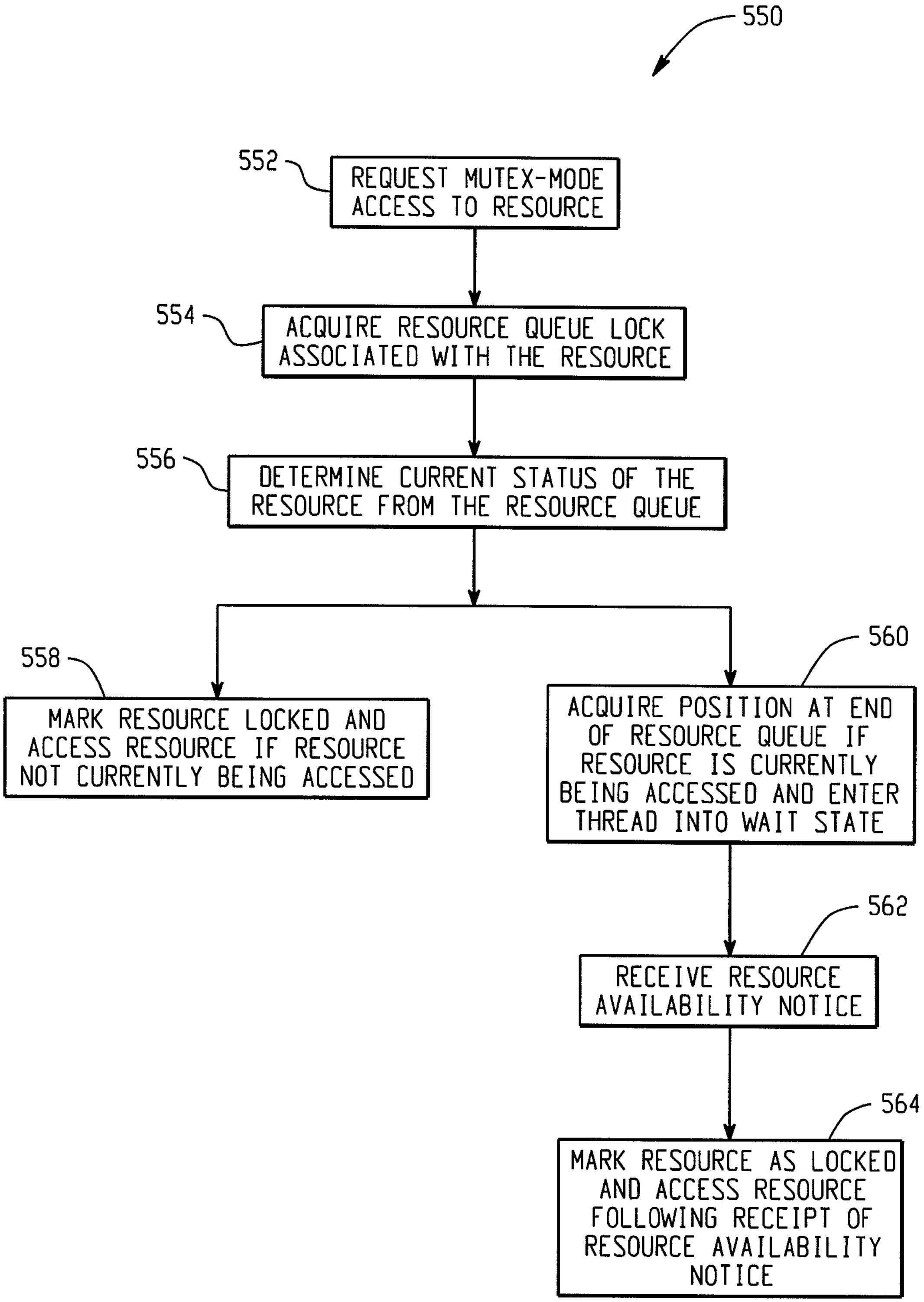
FIG. 18 is a flow diagram for a computer-implemented method of obtaining mutex-mode access by a requester to a resource in a pool of resources without requiring individual locks associated with each resource.

FIG. 18 is a flow diagram for a computer-implemented method of obtaining mutex-mode access by a requester to a resource in a pool of resources without requiring individual locks associated with each resource. Mutex-mode access to the resource is requested, where a resource queue is associated with the resource at 552. A resource queue lock associated with the resource is acquired at 554, where a resource queue lock is associated with multiple resources and a resource is associated with a single resource queue lock. At 556, the current status of the resource is determined from the resource queue. At 558, the resource is marked as locked and the resource is accessed if the resource is not currently being accessed. If the resource is currently being accessed, then the requester is positioned at the end of the resource queue, and the requester is placed into a wait state as shown at 560. At 562, a resource availability notice is received, and the resource is noted as locked and the resource is accessed at 564 following receipt of the availability notice.

Figure 19:
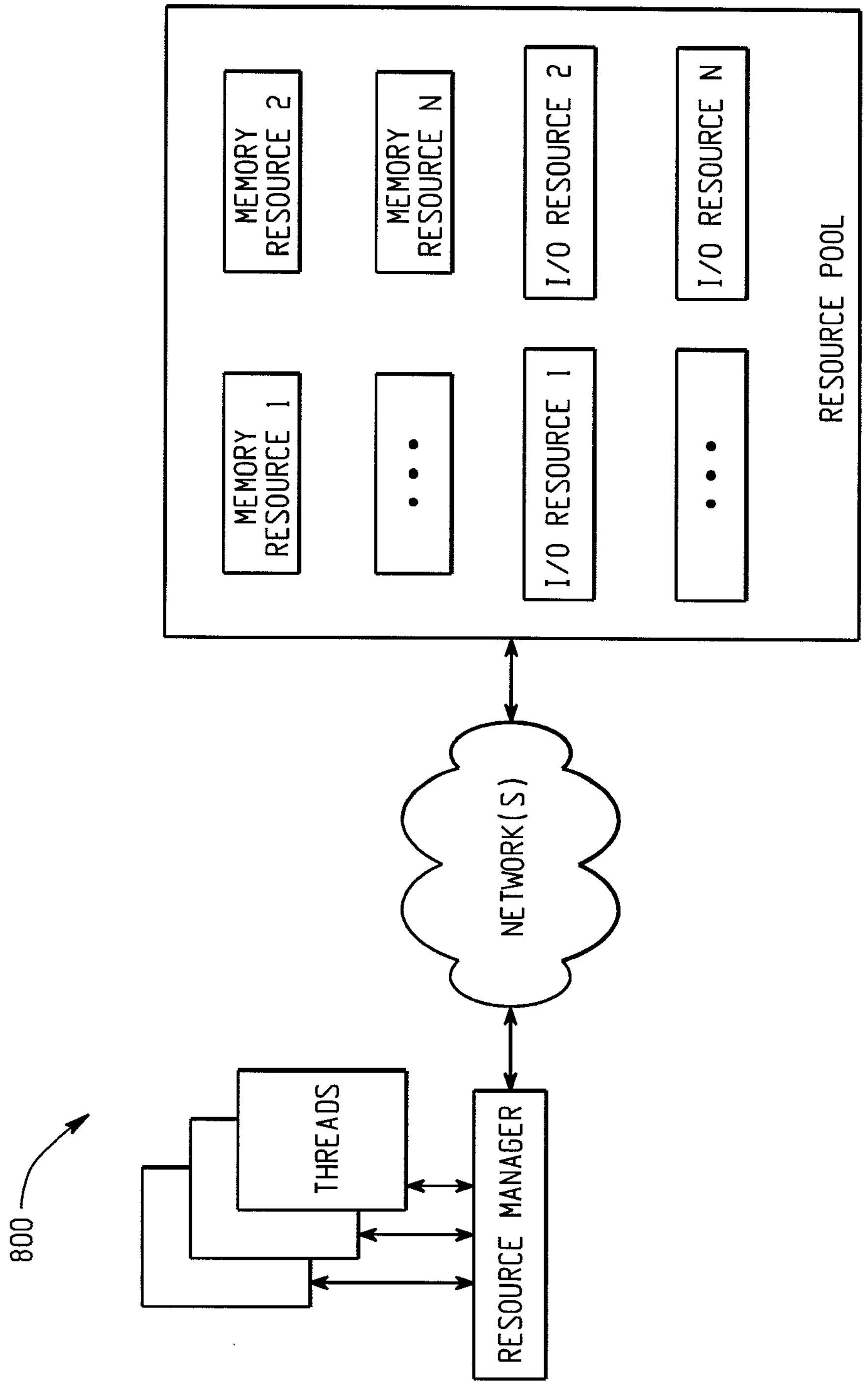
FIG. 19 is a block diagram depicting an environment wherein requesters can interact with a resource management system.

While examples have been used to disclose the invention, including the best mode, and also to enable any person skilled in the art to make and use the invention, the patentable scope of the invention is defined by claims, and may include other examples that occur to those skilled in the art. Accordingly, the examples disclosed herein are to be considered non-limiting. As an illustration, the systems and methods may be implemented on various types of computer architectures, such as for example via a network/server configuration (as shown at 800 on FIG. 19) or other networked system, or in a client-server configuration, or in an application service provider configuration. Additionally, one skilled in the art would recognize that the steps and data structures used as examples may be rearranged or otherwise modified while still accomplishing the desired results.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method, comprising:

receiving multiple requests for access to a resource when the resource is being accessed, wherein each of the received requests is generated by a different requesting thread, and wherein a request for access includes a request for read, write or mutex access to the resource;

dynamically forming a resource queue which orders the multiple requesting threads using a linked list structure, wherein dynamically forming the resource queue includes temporarily locking the resource queue; and providing requesting threads with synchronized access to the resource, wherein synchronized access is provided to the requesting threads ordered by the resource queue, wherein providing is performed using the linked list structure and without activating an operating system lock associated with the resource, and wherein providing synchronized access further includes:

providing simultaneous read access to multiple requesting threads, wherein providing simultaneous read access includes updating the resource queue by removing the multiple requesting threads to which read access is provided; and providing exclusive access to the resource, wherein the exclusive access to the resource is provided to a thread that is associated with a received request for write access to the resource.

2. The method of claim 1, wherein synchronized access is access that is unaffected by resource contention.

3. The method of claim 1, wherein the multiple requests for access to the resource are received in a first receiving order, and wherein dynamically forming the resource queue includes forming, for each of the multiple requesting threads, a specific resource queue entry corresponding to the requesting thread, wherein the resource queue entries are stored in a queuing order determined based on the first receiving order, and wherein a first one of the resource queue entries includes:

a first pointer indicating the requesting thread to which the first resource queue entry corresponds; and a second pointer indicating a second one of the resource queue entries which immediately precedes the first resource queue entry in the queuing order.

4. The method of claim 3, further comprising:

altering the second pointer so that the second pointer is a null pointer, wherein altering is done when access to the resource is given to a requesting thread associated with the immediately preceding one of the resource queue entries.

5. The method of claim 4, wherein the first resource queue entry further includes a third pointer indicating a third one of the resource queue entries which immediately follows the first resource queue entry in the queuing order.

6. The method of claim 1, wherein providing requesting threads with synchronized access includes preventing mutex access to a resource from being obtained by more than one requesting thread at a time.

7. The method of claim 1, wherein providing simultaneous read access to multiple requesting threads includes:

maintaining a counter that indicates a number of the requesting threads to which simultaneous read access is provided;

detecting when read access is relinquished by a thread to which simultaneous read access was provided; and decrementing the counter in response to the detection.

8. The method of claim 1, wherein providing requesting threads with synchronized access to the resource includes performing a memory fence operation.

9. The method of claim 1, further comprising:

imposing global lock in response to receiving a first one of the requests for access to the resource, wherein the first request for access to the resource is associated with a first one of the requesting threads, wherein the resource is included in a resource data store, and wherein the global lock facilitates protected searching for the resource within the resource data store.

10. The method of claim 9, wherein the first requesting thread locates the resource while the global lock is active, and wherein the method further includes releasing the global lock in response to the first requesting thread locating the resource.

11. The method of claim 1, wherein dynamically forming a resource queue includes using a resource queue pointer to indicate whether the resource is active or inactive.

12. The method of claim 1, wherein a resource queue pointer is set to NULL when the resource is inactive.

13. The method of claim 12, further comprising:

subsequent to receiving the multiple requests for access to the resource, receiving a new request for access to the resource while the resource is not being accessed, wherein the new request is associated with a first requesting thread;

imposing a global lock which facilitates locating the resource;

determining that the first requesting thread has located the resource; and imposing a temporary resource queue lock in response to determining that the resource has been located.

14. The method of claim 13, further comprising:

while the resource queue is locked, determining that the resource queue pointer is set to NULL;

providing access the first requesting thread with access to the resource in response to determining that the resource queue pointer is set to NULL;

modifying the resource queue pointer to indicate that the resource is active; and releasing the global lock and the temporary resource queue lock.

15. The method of claim 12, wherein receiving multiple requests for access to a resource when the resource is being accessed includes:

receiving a first request for access when the resource is being accessed, wherein the first request for access is associated with a first requesting thread; and subsequent to receiving the first request for access, receiving a second request for access when the resource is being accessed, wherein the second request for access is associated with a second requesting thread, and wherein providing requesting threads with synchronized access to the resource includes:

examining the resource queue in response to receiving the first request for access, wherein examining the resource queue includes determining that the resource queue is empty; and initializing a first thread queue record associated with the first requesting thread, wherein the thread queue record includes a pointer which points to the first requesting thread.

16. The method of claim 15, wherein providing requesting threads with synchronized access to the resource includes:

examining the resource queue in response to the receiving the second request for access, wherein examining the resource queue includes determining that the resource queue is occupied; and initializing a second thread queue record associated with the second requesting thread, wherein the second thread queue record includes a pointer indicating the first thread queue record.

17. The method of claim 1, wherein providing requesting threads with synchronized access to the resource includes locking the linked list when one or more of the requesting threads is given access to the resource.

18. A system, comprising:

one or more processors;

one or more non-transitory computer-readable storage mediums containing instructions configured to cause the one or more processors to perform operations including:

receiving multiple requests for access to a resource when the resource is being accessed, wherein each of the received requests is generated by a different requesting thread, and wherein a request for access includes a request for read, write or mutex access to the resource;

dynamically forming a resource queue which orders the multiple requesting threads using a linked list structure, wherein dynamically forming the resource queue includes temporarily locking the resource queue; and providing requesting threads with synchronized access to the resource, wherein synchronized access is provided to the requesting threads ordered by the resource queue, wherein providing is performed using the linked list structure and without activating an operating system lock associated with the resource, and wherein providing synchronized access further includes:

providing simultaneous read access to multiple requesting threads, wherein providing simultaneous read access includes updating the resource queue by removing the multiple requesting threads to which read access is provided; and providing exclusive access to the resource, wherein the exclusive access to the resource is provided to a thread that is associated with a received request for write access to the resource.

19. The system of claim 18, wherein synchronized access is access that is unaffected by resource contention.

20. The system of claim 18, wherein receiving multiple requests for access to the resource includes receiving the multiple requests in a first receiving order, and wherein dynamically forming the resource queue includes forming, for each of the multiple requesting threads, a specific resource queue entry corresponding to the requesting thread, wherein the operations further include storing the resource queue entries in a queuing order determined based on the first receiving order, and wherein a first one of the resource queue entries includes:

a first pointer indicating the requesting thread to which the first resource queue entry corresponds; and a second pointer indicating a second one of the resource queue entries which immediately precedes the first resource queue entry in the queuing order.

21. The system of claim 20, further comprising:

altering the second pointer so that the second pointer is a null pointer, wherein altering is performed when access to the resource is given to a requesting thread associated with the immediately preceding one of the resource queue entries.

22. The system of claim 21, wherein the first resource queue entry further includes a third pointer indicating a third one of the resource queue entries which immediately follows the first resource queue entry in the queuing order.

23. The system of claim 18, wherein providing requesting threads with synchronized access includes preventing mutex or write access to a resource from being obtained by more than one requesting thread at a time.

24. The system of claim 18, wherein providing simultaneous read access to multiple requesting threads includes:

maintaining a counter that indicates a number of the requesting threads to which simultaneous read access is provided;

detecting when read access is relinquished by a thread to which simultaneous read access was provided; and decrementing the counter in response to the detection.

25. The system of claim 18, wherein providing requesting threads with synchronized access to the resource includes performing a memory fence operation.

26. The system of claim 18, wherein the operations further include:

imposing global lock in response to receiving a first one of the requests for access to the resource, wherein the first request for access to the resource is associated with a first one of the requesting threads, wherein the resource is included in a resource data store, and wherein the global lock facilitates protected searching for the resource within the resource data store.

27. The system of claim 26, wherein imposing the global lock is such that the first requesting thread locates the resource while the global lock is active, and wherein the operations further include releasing the global lock in response to the first requesting thread locating the resource.

28. The system of claim 27, wherein dynamically forming a resource queue includes using a resource queue pointer to indicate whether the resource is active or inactive.

29. The system of claim 28, wherein using a resource queue pointer to indicate whether the resource is active or inactive includes setting the resource queue pointer to NULL when the resource is inactive.

30. The system of claim 29, wherein the operations further include:

subsequent to receiving the multiple requests for access to the resource, receiving a new request for access to the resource while the resource is not being accessed, wherein the new request is associated with a first requesting thread;

imposing a global lock which facilitates locating the resource;

determining that the first requesting thread has located the resource; and imposing a temporary resource queue lock in response to determining that the resource has been located.

31. The system of claim 30, wherein the operations further include:

while the resource queue is locked, determining that the resource queue pointer is set to NULL;

providing access the first requesting thread with access to the resource in response to determining that the resource queue pointer is set to NULL;

modifying the resource queue pointer to indicate that the resource is active; and releasing the global lock and the temporary resource queue lock.

32. The system of claim 29, wherein receiving multiple requests for access to a resource when the resource is being accessed includes:

receiving a first request for access when the resource is being accessed, wherein the first request for access is associated with a first requesting thread; and subsequent to receiving the first request for access, receiving a second request for access when the resource is being accessed, wherein the second request for access is associated with a second requesting thread, and wherein providing requesting threads with synchronized access to the resource further includes:

examining the resource queue in response to receiving the first request for access, wherein examining the resource queue includes determining that the resource queue is empty; and initializing a first thread queue record associated with the first requesting thread, wherein the thread queue record includes a pointer which points to the first requesting thread.

33. The system of claim 32, wherein providing requesting threads with synchronized access to the resource includes:

examining the resource queue in response to receiving the second request for access, wherein examining the resource queue includes determining that the resource queue is occupied; and initializing a second thread queue record associated with the second requesting thread, wherein the second thread queue record includes a pointer indicating the first thread queue record.

34. The system of claim 18, wherein providing requesting threads with synchronized access to the resource includes locking the linked list when one or more of the requesting threads is given access to the resource.

35. A computer-program product, tangibly embodied in a machine-readable non-transitory storage medium, including instructions configured to cause a data processing apparatus to perform operations including:

receiving multiple requests for access to a resource when the resource is being accessed, wherein each of the received requests is generated by a different requesting thread, and wherein a request for access includes a request for read, write or mutex access to the resource;

dynamically forming a resource queue which orders the multiple requesting threads using a linked list structure, wherein dynamically forming the resource queue includes temporarily locking the resource queue; and providing requesting threads with synchronized access to the resource, wherein synchronized access is provided to the requesting threads ordered by the resource queue, wherein providing is performed using the linked list structure and without activating an operating system lock associated with the resource, and wherein providing synchronized access further includes:

providing simultaneous read access to multiple requesting threads, wherein providing simultaneous read access includes updating the resource queue by removing the multiple requesting threads to which read access is provided; and providing exclusive access to the resource, wherein the exclusive access to the resource is provided to a thread that is associated with a received request for write access to the resource.

36. The computer-program product of claim 35, wherein synchronized access is access that is unaffected by resource contention.

37. The computer-program product of claim 35, wherein receiving multiple requests for access to the resource includes receiving the multiple requests in a first receiving order, and wherein dynamically forming the resource queue includes forming, for each of the multiple requesting threads, a specific resource queue entry corresponding to the requesting thread, wherein the operations further include storing the resource queue entries in a queuing order determined based on the first receiving order, and wherein a first one of the resource queue entries includes:

a first pointer indicating the requesting thread to which the first resource queue entry corresponds; and a second pointer indicating a second one of the resource queue entries which immediately precedes the first resource queue entry in the queuing order.

38. The computer-program product of claim 37, wherein the operations further include:

altering the second pointer so that the second pointer is a null pointer, wherein altering is done when access to the resource is given to a requesting thread associated with the immediately preceding one of the resource queue entries.

39. The computer-program product of claim 38, wherein the first resource queue entry further includes a third pointer indicating a third one of the resource queue entries which immediately follows the first resource queue entry in the queuing order.

40. The computer-program product of claim 35, wherein providing requesting threads with synchronized access includes preventing mutex access to a resource from being obtained by more than one requesting thread at a time.

41. The computer-program product of claim 35, wherein providing simultaneous read access to multiple requesting threads includes:

maintaining a counter that indicates a number of the requesting threads to which simultaneous read access is provided;

detecting when read access is relinquished by a thread to which simultaneous read access was provided; and decrementing the counter in response to the detection.

42. The computer-program product of claim 35, wherein providing requesting threads with synchronized access to the resource includes performing a memory fence operation.

43. The computer-program product of claim 35, wherein the operations further include:

imposing global lock in response to receiving a first one of the requests for access to the resource, wherein the first request for access to the resource is associated with a first one of the requesting threads, wherein the resource is included in a resource data store, and wherein the global lock facilitates protected searching for the resource within the resource data store.

44. The computer-program product of claim 43, wherein the first requesting thread locates the resource while the global lock is active, and wherein the operations further include releasing the global lock in response to the first requesting thread locating the resource.

45. The computer-program product of claim 35, wherein dynamically forming a resource queue includes using a resource queue pointer to indicate whether the resource is active or inactive.

46. The computer-program product of claim 45, wherein the operations further include:

setting the resource queue pointer to NULL when the resource is inactive.

47. The computer-program product of claim 46, wherein the operations further include:

subsequent to receiving the multiple requests for access to the resource, receiving a new request for access to the resource while the resource is not being accessed, wherein the new request is associated with a first requesting thread;

imposing a global lock which facilitates locating the resource;

determining that the first requesting thread has located the resource; and imposing a temporary resource queue lock in response to determining that the resource has been located.

48. The computer-program product of claim 47, further comprising:

while the resource queue is locked, determining that the resource queue pointer is set to NULL;

providing access the first requesting thread with access to the resource in response to determining that the resource queue pointer is set to NULL;

modifying the resource queue pointer to indicate that the resource is active; and releasing the global lock and the temporary resource queue lock.

49. The computer-program product of claim 46, wherein receiving multiple requests for access to a resource when the resource is being accessed includes:

receiving a first request for access when the resource is being accessed, wherein the first request for access is associated with a first requesting thread; and subsequent to receiving the first request for access, receiving a second request for access when the resource is being accessed, wherein the second request for access is associated with a second requesting thread, and wherein providing requesting threads with synchronized access to the resource includes:

examining the resource queue in response to receiving the first request for access, wherein examining the resource queue includes determining that the resource queue is empty; and initializing a first thread queue record associated with the first requesting thread, wherein the thread queue record includes a pointer which points to the first requesting thread.

50. The computer-program product of claim 49, wherein providing requesting threads with synchronized access to the resource includes:

examining the resource queue in response to the receiving the second request for access, wherein examining the resource queue includes determining that the resource queue is occupied; and initializing a second thread queue record associated with the second requesting thread, wherein the second thread queue record includes a pointer indicating the first thread queue record.

51. The computer-program product of claim 35, wherein providing requesting threads with synchronized access to the resource includes locking the linked list when one or more of the requesting threads is given access to the resource.

* * * * *